(12) United States Patent
Moncalvo et al.

(10) Patent No.: US 12,461,587 B2
(45) Date of Patent: Nov. 4, 2025

(54) VIRTUAL AND AUGMENTED REALITY UNITS, SYSTEMS AND METHODS

(71) Applicant: ARuVR Limited, London (GB)

(72) Inventors: Marco Moncalvo, London (GB); Francesco Furnari, London (GB)

(73) Assignee: ARuVR Limited, Station Passage (GB)

( * ) Notice: Subject to any disclaimer, the term of this patent is extended or adjusted under 35 U.S.C. 154(b) by 653 days.

(21) Appl. No.: 17/753,314

(22) PCT Filed: Aug. 28, 2020

(86) PCT No.: PCT/GB2020/052063
§ 371 (c)(1),
(2) Date: Feb. 28, 2022

(87) PCT Pub. No.: WO2021/038236
PCT Pub. Date: Mar. 4, 2021

(65) Prior Publication Data
US 2022/0269339 A1    Aug. 25, 2022

(30) Foreign Application Priority Data
Aug. 29, 2019  (GB) ...................... 1912431

(51) Int. Cl.
*G06F 3/01* (2006.01)
*G06T 19/00* (2011.01)
(Continued)

(52) U.S. Cl.
CPC ............ *G06F 3/011* (2013.01); *G06T 19/006* (2013.01); *G09B 5/067* (2013.01); *G09B 5/10* (2013.01); *H04W 84/12* (2013.01)

(58) Field of Classification Search
CPC .......... G06F 3/011; G06F 3/01; G06T 19/006; G09B 5/10; H04W 84/12
See application file for complete search history.

(56) References Cited

U.S. PATENT DOCUMENTS 9,446,319 B2 *   9/2016  Barney ................... A63F 13/25
11,172,013 B2 * 11/2021  Teglas ................... G06F 16/957
(Continued)

FOREIGN PATENT DOCUMENTS

WO    WO2010118145    10/2010

*Primary Examiner* — Timothy A Musselman
(74) *Attorney, Agent, or Firm* — Wolf, Greenfield & Sacks, P.C.

(57) ABSTRACT

A presentation system (1000) comprises a computer (1), a presentation unit (10) and a plurality of VR/AR terminals (100) for use by respective users (U). The presentation unit (10) comprises a case (11), a PCB (12) accommodated within said case (11) supporting a processor (13) operatively coupled to a memory (14). Networking apparatus (15) allows communication between the computer (1), the presentation unit (10) and the VR/AR terminals (100). Presentation software is stored in the memory (14) and ensures that, if required, a predetermined presentation (200) comprising interactive information (202) is transmitted to the VR/AR terminals (100). The presentation software (20) includes communication software (22) that causes the processor (13): (a) to receive from the computer (1) and transmit to the VR/AR terminals (100) commands that cause the VR/AR terminals (100) to output elements (203) of said interactive information (202) that guide the users (U) through the presentation (200) while the presentation (200) is presented to them; and, (b) to receive from the VR/AR terminals (100) and transmit to the computer (1) interactive feedback (204) generated by the users (U) during the presentation (200).

18 Claims, 12 Drawing Sheets

(51) Int. Cl.
*G09B 5/06* (2006.01)
*G09B 5/10* (2006.01)
*H04W 84/12* (2009.01)

(56) References Cited

U.S. PATENT DOCUMENTS

2005/0003330 A1  1/2005  Asgarinejad et al.
2013/0132852 A1  5/2013  Sommer
2016/0189429 A1  6/2016  Mallinson
2018/0122254 A1  5/2018  Rangan et al.

* cited by examiner

VIRTUAL AND AUGMENTED REALITY UNITS, SYSTEMS AND METHODS

RELATED APPLICATIONS

This application claims the benefit of PCT patent application no. PCT/GB2020/052063 filed Aug. 28, 2020 which claims priority to Great Britain patent application no. 1912431.2 filed Aug. 29, 2019, which are hereby incorporated herein in their entirety by reference.

TECHNICAL FIELD

The present invention relates to virtual reality (VR) and/or augmented reality (AR) presentation units, systems and methods. More particularly, the present invention relates to VR and/or AR presentation units, systems and methods for training a plurality of users (or trainees).

BACKGROUND

Virtual Reality and Augmented Reality have each independently been suggested as among a number of modern technologies which, in the coming years, are likely to transform profoundly the way we live and work.

With Virtual Reality, users can experience immersive environments provided by VR systems, which may include, for example, wearable VR headsets. In gaming applications, for example, users can feel part of the game environment and feel able to interact with real-looking features via one or more VR gaming consoles, connected to the VR headsets, which may include, for example, haptic feedback.

With Augmented Reality, users can experience information-enriched environments provided by AR systems, which can be similar to VR systems and for example also include wearable AR headsets.

VR/AR systems are, of course, computer-based, and can therefore employ some among a large variety of existing hardware and software solutions. Good VR/AR hardware and software are key to the fruition of not just satisfactory, but exciting VR/AR experiences. VR/AR hardware comprises a large variety of different VR and/or AR devices, including—perhaps most notably—smart phones, with new and more powerful models being frequently released on the market. Other VR and/or AR devices include, for example, dedicated VR and/or AR headsets and/or goggles. A large variety of VR/AR software products exist, and these are usually tailored to specific applications such as gaming, simulation, entertainment, presentation (teaching) or training. Development efforts in the VR and AR arts are currently being carried out in both the hardware and software directions.

VR applications of particular interest are presenting (teaching) and training. Accordingly, presenting/teaching and training are delivered by presenters or teachers (or, trainers) and received by trainees (or, students) in realistic conditions (albeit, of course, virtually in the case of Virtual Reality), at reduced costs, while the consequences of potential failures during training are, effectively, eliminated. Reference is made, for example, to medical VR applications in which users are taught, and train, for example, in the field of surgical procedures. Other suitable examples include flight simulations and virtual manufacturing.

In VR/AR applications, the required content may be stored locally in the application file system, or may be streamed from a server, passively, or on-demand. However, a limitation of current VR/AR systems is that they are essentially built for individual experiences. Accordingly, collective (ie, group) VR/AR experiences may not yet be satisfactory, and indeed are often found to be at least disruptive, and can sometime be clunky or even troublesome. There is accordingly a need for improved VR/AR experiences, particularly for an audience comprising multiple VR/AR users wishing to experience VR and/or AR content collectively yet seamlessly, particularly in connection with training applications, wherein content is presented by one or more presenters/teachers (or, trainers) to an audience comprising, potentially, up to a large number of trainees (or, students).

Over the next few years, VR/AR applications are expected to become increasingly sophisticated and widespread. However, as the level of adoption and sophistication increases, the problem of maintaining and/or improving user experience will remain at the heart of Virtual Reality and Augmented Reality. There is, therefore, also a more general need to deliver VR and/or AR systems and related methods that provide natural, seamless VR/AR experiences.

SUMMARY OF THE INVENTION

According to a first aspect, there is disclosed a presentation unit for presenting to a plurality of VR/AR terminals for use by respective users. The presentation unit comprises a case, a printed circuit board (PCB) accommodated within said case, the PCB supporting a processor and a memory operatively connected to said processor. The presentation unit further comprises networking apparatus for communicating with a computer and the plurality of VR/AR terminals across a network. Presentation software stored on said memory is configured to cause the processor to perform first processes. These first processes are in some way related, or associated, with the presence (or absence) of a predetermined presentation in one or more of the VR/AR terminals. For example, these first processes may be related to the steps of ensuring, or checking whether, the predetermined presentation has been uploaded on a subgroup, on each and/or on all of the VR/AR terminals, since it will not be in the intention of a presenter to start the presentation until the relevant users (ie, the presenter's audience) have received the predetermined presentation and the presentation is therefore accessible to their respective terminals. Importantly, the predetermined presentation comprises interactive information, ie presentation content that allows the presenter to interact with the users during the presentation. So that said interaction may take place effectively and efficiently, even when the number of users is large, and the presentation may be heavy with respect to the computational resources of the computer and/or any of the terminals, the presentation software includes dedicated communication software configured to cause the processor to perform second processes distinct from said first processes and dedicated to presenter/user interaction. These second processes only take place if the predetermined presentation has been received by, and is therefore accessible to, the relevant one or more VR/AR terminals, and while the predetermined presentation is presented to the users on the respective VR/AR terminals. In more detail, the second processes include at least receiving one or more commands to output corresponding one or more elements of said interactive information on the terminals on which the presentation is being presented, said one or more commands generated by the presenter on the computer; and/or, receiving interactive feedback (which, as it will be understood, will take the form of one or more appropriate electronic signals) generated by one or more of the users using the respective VR/AR terminals; and/or, transmitting a first set of instructions to each VR/AR terminal to output (for example in the form of visual output, on respective screens) said one or more elements of said interactive information; and/or transmitting a second set of instructions to the computer to output (again, for example in the form of visual output, on the computer's screen) the interactive feedback. In this way, the audience can enjoy, as a group, simultaneous and seamless delivery of presentation content, including interactive presentation content, and can provide feedback thereon to the presenter, each of which enhances the presentation delivery and fruition experiences.

Preferably, the networking apparatus comprises a first antenna for wireless communication across said network.

Preferably, the network is a local area network.

Preferably, the first antenna provides a single access point to said local network.

Preferably, said networking apparatus comprises a second antenna for connecting the presentation unit to the Internet.

Alternatively, the presentation unit may be configured as a cloud server, and said network may be the Internet.

Preferably, the first processes comprise directly or indirectly causing the predetermined presentation to be transmitted to the VR/AR terminals from the Internet. Accordingly, the predetermined presentation may be stored in one or more servers connected to the Internet. Said one or more servers may be part of a content delivery network (CDN). Here, the term "indirectly" refers to causing the described effect after a number of further processes have taken place, which may be internal or external to the presentation unit. The term "directly" instead refers to causing the described effect as an immediate result of said first processes.

Preferably, the first processes comprise directly causing the predetermined presentation to be transmitted to the one or more VR/AR terminals from the presentation unit, which may be the case for example when the presentation unit is configured as a local server in the local area network.

Preferably, the presentation software comprises delivery software configured to transmit the predetermined presentation to said VR/AR terminals upon receiving a corresponding trigger from the communication software, which oversees the ability of the VR/AR terminals to have access to the required presentation.

Optionally, the presentation software includes a database manager configured to assist the delivery software in retrieving the predetermined presentation from said memory. This is not required when the presentation unit is configured as a cloud/Internet server, in which case, as described herein, the predetermined presentation may be stored in the Cloud/Internet.

Preferably, the delivery software is configured to utilize a conventional communication protocol for transmitting the predetermined presentation to said VR/AR terminals. This simplifies the delivery software, which could then be available as an off-the-shelf module, or in any event require minimum customisation.

Preferably, the conventional communication protocol is Hyper Text Transfer Protocol (HTTP).

Very preferably, the communication software comprises a socket server, that is a programme which defines and manages the use of one or more sockets on the presentation server. It will be understood that "socket" as used herein refers, as in the relevant arts, to combinations of IP addresses and ports defined on the presentation unit.

Very preferably, therefore, the socket server is configured to define and manage one or more sockets which can individually and/or collectively be dedicated to the receiving and/or transmitting described herein in connection with the communication software, that is:

receiving one or more commands to output corresponding one or more elements of said interactive information, said one or more commands having been generated by the presenter using the computer; and/or receiving interactive feedback generated by one or more of the users using the respective VR/AR terminals; and/or transmitting a first set of instructions to each VR/AR terminal to output said one or more elements of said interactive information; and/or transmitting a second set of instructions to the computer to output the interactive feedback.

Very preferably, the socket server is configured to define and manage: a first communication channel dedicated to communication between the computer and the presentation unit; and/or a second communication channel dedicated to communication between the presentation unit and said VR/AR terminals, wherein said first and second communication channels each comprise said one or more sockets. This arrangement may further reduce or eliminate any inter-device communication latencies.

Advantageously, a third communication channel for communication between the computer and said VR/AR terminals is defined by the first and second communication channels.

Preferably, the communication software is configured to utilize a custom communication protocol for said receiving and/or transmitting. This may further enhance communication across the network between the devices.

Preferably, the presentation software comprises presentation management software accessible from said computer over said network and arranged to provide the computer with an interface for creating, editing and/or playing the predetermined presentation.

Optionally, the presentation management software is accessible from a Web browser installed on said computer.

Optionally, the interface is a Web interface.

Very preferably, the VR/AR terminals comprise at least one VR terminal.

Preferably, the predetermined presentation comprises VR content comprising one or more VR media.

Optionally, the VR media are selected from 2D or 360 photos or videos, or 3D objects.

Alternatively or additionally, the VR/AR terminals may comprise at least one AR terminal comprising a camera for capturing images for integration with said predetermined presentation.

Preferably, the predetermined presentation comprises one or more markers for instigating output on said VR/AR terminals of selected elements of said one or more elements of the interactive information.

Said elements of the interactive information may comprise one or more of: a text, a shape, a position indicator and an interactive feature such as a poll, a quiz or a game.

The interactive feedback may relate to one or more user feedback tools selected from one or more of: a field of view, a direction of view, a feedback signal generated by interaction of the user with a feedback feature of the respective VR/AR terminal, such as a response to a poll or a quiz, and information related to the status of the respective VR/AR terminal such as a charge status of the VR/AR terminal if the VR/AR terminal is battery operated.

The predetermined presentation may comprise one or more presentation slides

Accordingly, said second processes may further comprise receiving one or more navigation inputs generated by the presenter using the computer.

Accordingly, said second processes my also further comprise transmitting a third set of instructions to at least a subgroup of the VR/AR terminals so that said subgroup simultaneously outputs a selected presentation slide.

According to a further aspect, there is provided a presentation system comprising a presentation unit as described herein, a computer as described herein, and a plurality of VR/AR terminals as described herein.

The presentation unit, the computer and said VR/AR terminals may be arranged to communicate over a network as described herein.

Optionally, said plurality of VR/VR terminals comprises one or more headsets.

Optionally, said one or more headsets may comprise one or more smart phones.

Optionally, the presentation system further comprises one or more non-VR/AR terminals for presenting said presentation. This could be useful to the presenter, for monitoring progress of the presentation, for example on an auxiliary screen.

Optionally, the one or more non-VR/AR terminals include any one or more of a desktop computer, a portable computer, a tablet and a screen.

In preferred solutions where the presentation unit is configured as a local area network server, the networking apparatus comprises first and second antennas as described herein.

Preferably, the computer is arranged to obtain Internet access from said second antenna.

Alternatively, as described herein, the presentation unit may be configured as a cloud server and the network described herein may be Internet.

According to a further aspect, there is provided a method of creating and/or editing a presentation using a presentation system as described herein, the method comprising using presentation management software as described herein, creating and/or editing a predetermined presentation as described herein using the computer as described herein.

According to a further aspect, there is provided a method of presenting a presentation using a presentation system as described herein, the method comprising, using communication software as described herein: receiving one or more commands to output corresponding one or more elements of interactive information as described herein, said or more commands generated by a presenter using a computer as described herein; and/or, receiving interactive feedback generated by one or more of users using respective VR/AR terminals as described herein; and/or, transmitting a first set of instructions to each VR/AR terminal to output said one or more elements of the interactive information; and/or, transmitting a second set of instructions to the computer to output the interactive feedback.

According to a further aspect, there is provided a method of providing a presentation to a plurality of VR/AR terminals using a presentation system as described herein, the method comprising: using communication software as described herein, sequentially interrogating VR/AR terminals as described herein about the presence on each VR/AR terminal of a predetermined presentation as described herein; and, directly or indirectly, causing the predetermined presentation to be transmitted to one or more of the VR/AR terminals, if said one or more VR/AR terminals do not store or have access to the predetermined presentation; optionally, using the communication software to trigger delivery software as described herein to transmit the predetermined presentation to the VR/AR terminals.

BRIEF DESCRIPTION OF THE DRAWINGS

The invention will now be described, purely by way of example, with reference to the accompanying drawings, in which.

DESCRIPTION

In the description of presentation units, systems and methods that follows, reference is made primarily to FIGS. 1-10, which show relevant features related to these units, systems and methods. FIGS. 11-14 are referenced throughout the description when needed to provide the reader with a basic understanding of the experience that the units, systems and methods described herein may offer to presenters/teachers on one side, and users/students (or trainees), on the other side.

Figure 1:
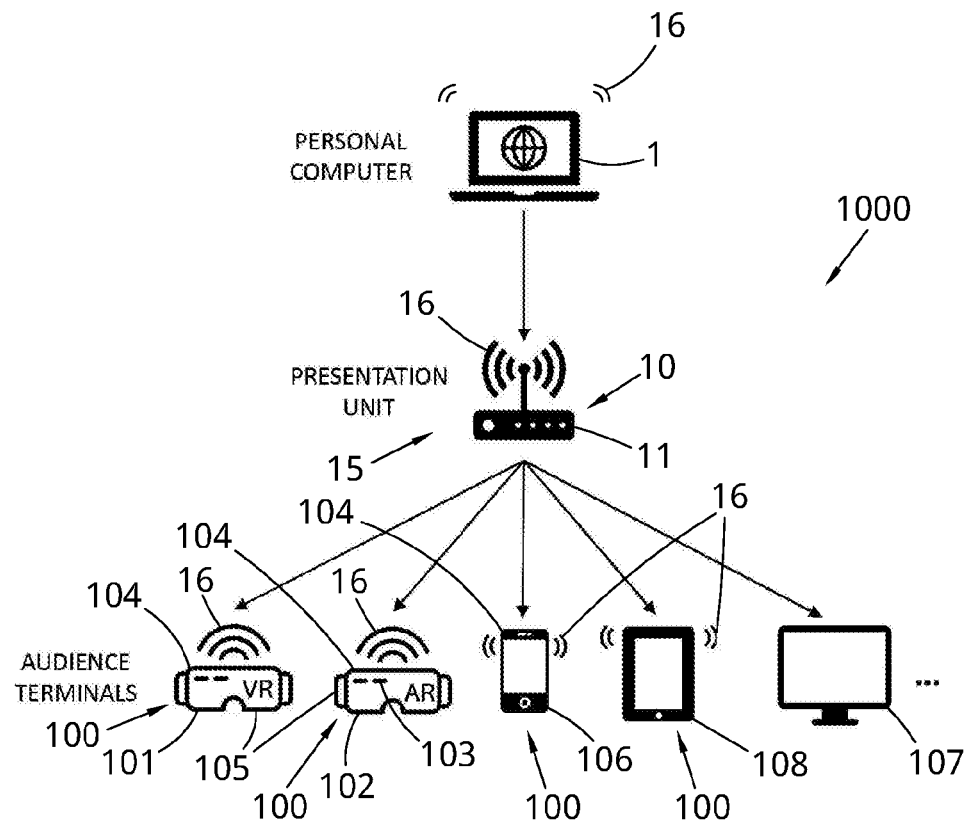
FIG. 1 is a system diagram showing a presentation system according to embodiments of the present invention.

With reference to FIG. 1, there is provided a presentation unit 10 for presenting to a plurality of VR/AR terminals 100 used by respective users U (shown in FIGS. 5 and 7) forming, together, an audience.

The VR/AR terminals 100 described herein include VR terminals 101, AR terminals 102 and/or terminals which could interchangeably be used as VR terminals and/or AR terminals, such as smart phones 106 or tablets 108, as the case may be. AR terminal 102 may include a camera 103 for capturing images, including live images, as known in the arts, which can then be integrated in a presentation in the form of base presentation content, if needed. VR/AR terminals 101, 102, 106 form a subgroup 104 with respect to the totality of the VR/AR terminals 100 connected to the presentation unit 10. As shown in FIG. 1, said subgroup 104 includes, in this case, some VR/AR terminals 101, 102 in the form of headsets 105 for installation on respective heads of the users U. However, other subgrouping criteria may be possible.

It will be appreciated that VR/AR terminals 100 are computerized devices, and that, as such, they comprise hardware and software. Said hardware is not further described herein. Regarding the software, a presentation application or "app" 110 is installed in each VR/AR terminal, so that the benefits of the presentation system 1000 are accessible. These apps are referenced in system diagrams 9 and 10.

Among the devices that may be connected to the presentation units 10 described herein there are in addition non-VR/AR terminals 107, such as one or more screen-equipped terminals, which could be in the form of simple screens or displays, and/or laptop or desktop computers, as shown in FIG. 1. The role of these optional devices 107 could be to provide the presenter with feedback as to the progress of a presentation.

As also shown in FIG. 1, a personal computer (PC) 1 is connected to the presentation unit 10 via a network 16 (schematically represented in FIG. 1 by wireless connectivity symbols). The VR/AR terminals 100 are also connected to said network 16, and therefore to the computer 1, via the presentation unit 10. The network 16 is further described below. Examples of suitable networks include local area networks (LANs) or the Internet/Cloud (it will be appreciated that herein the terms "Cloud" and "Internet" are used interchangeably). As it will be understood, the term "network" is also used herein broadly, in particular to encompass wired as well as wireless networks, and different network types, such as domestic networks, workplace networks, local networks, distributed networks, the Cloud/Internet, etc. as known in the arts.

Using a presentation system 1000 as shown in FIG. 1, which comprises the presentation unit 10, the VR/AR terminals 100 and, additionally, the personal computer 1, a presenter P (shown in FIGS. 3, 5 and 7) can deliver predetermined presentations to the audience. As it will be described further below, these predetermined presentations are specifically devised to allow the presenter P to deliver a smooth, fluid and trouble-free VR/AR experience to the users U, collectively. Further, the presenter P can interact with its audience during the presentations. For example, the presenter is able to control progress of the presentation via the personal computer 1, although this is just a basic interactive feature of the presentations described herein. More interestingly for the present purposes, the system 1000 also allows the users U to interact with the presenter P during the presentations, which may further enhance the experience, both on the presenter and audience sides. Further manners of interaction are however possible and are further described below.

Turning now to the physical, ie hardware, aspects of the presentation unit 10, with continued reference to FIG. 1 the presentation unit 10 includes a case 11. As intended herein, the term "case" (or any of equivalent terms that could be used such as "box" or "shell") is to be given its broadest interpretation, that is of a physical envelope capable of containing one or more features described hereinbelow, which features include appropriate additional hardware and software.

Figure 2:
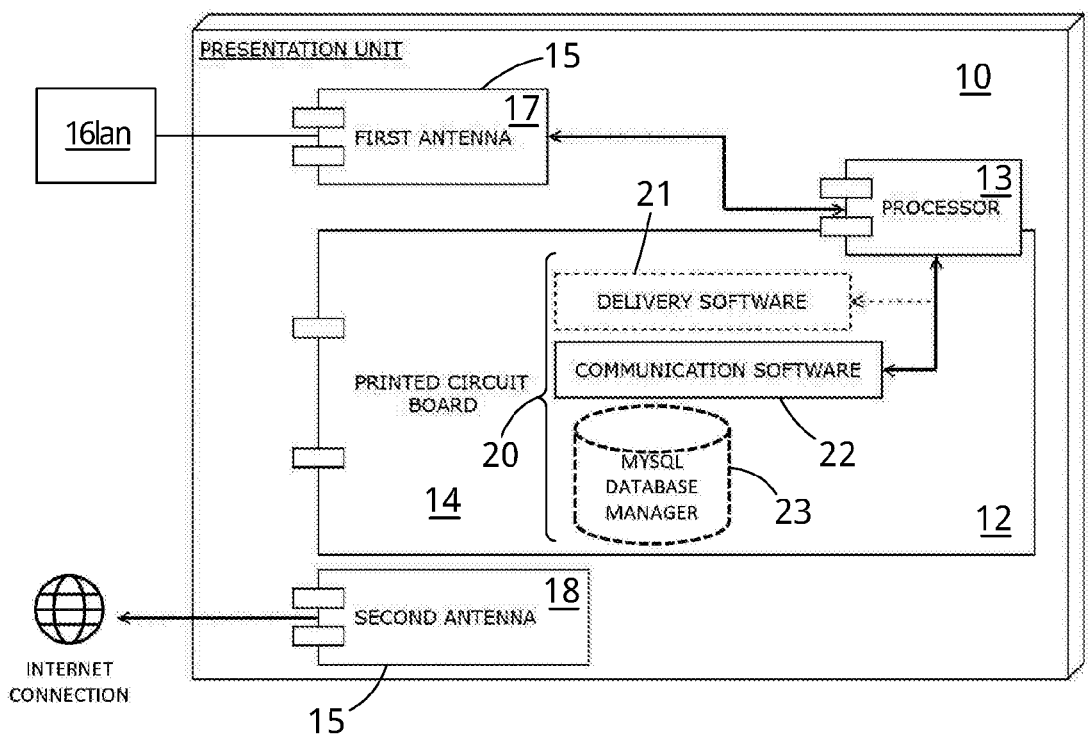
FIG. 2 is a block representation of parts of a presentation unit according to an embodiment of the present invention included in a presentation system according to FIG. 1.

With reference now to FIG. 2, there is illustrated a presentation unit 10 that can be used in VR/AR systems 1000 according to FIG. 1. In the presentation unit 10, a printed circuit board (PCB) 12 is housed within the case 11. The PCB supports a processor 13 and a memory 14 operatively connected to said processor 13.

As used herein, the terms "processor" and "memory" are also to be construed as broadly as possible. "Processor" may thus encompass a single processor or multiple processors interconnected so as to provide, for example, increased computational power. Likewise, "memory" may refer to a single memory or to multiple memories interconnected so as to provide increased storage or added functionality. Further, said processor(s) and memory(ies) may be provided on a single or multiple and interconnected PCBs, as known in the arts. Further still, said processor(s) and memory(ies) may be of different types, as also known in the arts, for example solid-state or otherwise. However, the working principles and possible architectures of these processor(s) and memory(ies) are not within the scope of the present disclosure and will therefore not be further described herein.

To satisfy the network connectivity requirements, the presentation unit 10 of FIG. 2 also includes networking apparatus 15 for networking with the personal computer 1 and the plurality of VR/AR terminals 100 across the network 16, which in this case is a LAN 16*lan*. The presentation unit 10 shown in FIG. 2 is thus effectively configured as a local server within the LAN 16*lan*.

With continued reference to FIG. 2, the main hardware elements of the presentation unit 10 are illustrated together with the main software components. In particular, a presentation software suite 20 is stored on the memory 14, and attends to two main functions:

a) first, the presentation software suite 20 oversees (in this version of presentation unit 10 by including a dedicated delivery software package 21, which is further described below) a number of first processes 30 (some of which are represented in more detail in FIG. 6) associated in some way with the presence (or absence) of the required presentation files in each of the plurality of VR/AR terminals 100. These presentation files are to be used by the users U to attend and thus participate in a predetermined presentation, when the presenter P so directs; and, b) second, the presentation software suite 20 is also responsible for managing traffic of information related to the presentation occurring between the presenter P and the users U, which information may be exchanged in either direction by the presenter P and the users U during the presentation thus making the presentation interactive and, so entertaining, interesting and impactful.

Examples of information exchanged between the presenter P and the users U are provided below. Since the information is exchanged interactively between the presenter P and the users U, we refer to the information described herein as "interactive information" 202 (this is referenced, for example, in FIG. 13), if directed from the presenter P to the users U, and "interactive feedback" 204 (referenced, for example, in FIGS. 8B and 13), if directed from the users U to the presenter P.

Figure 12:
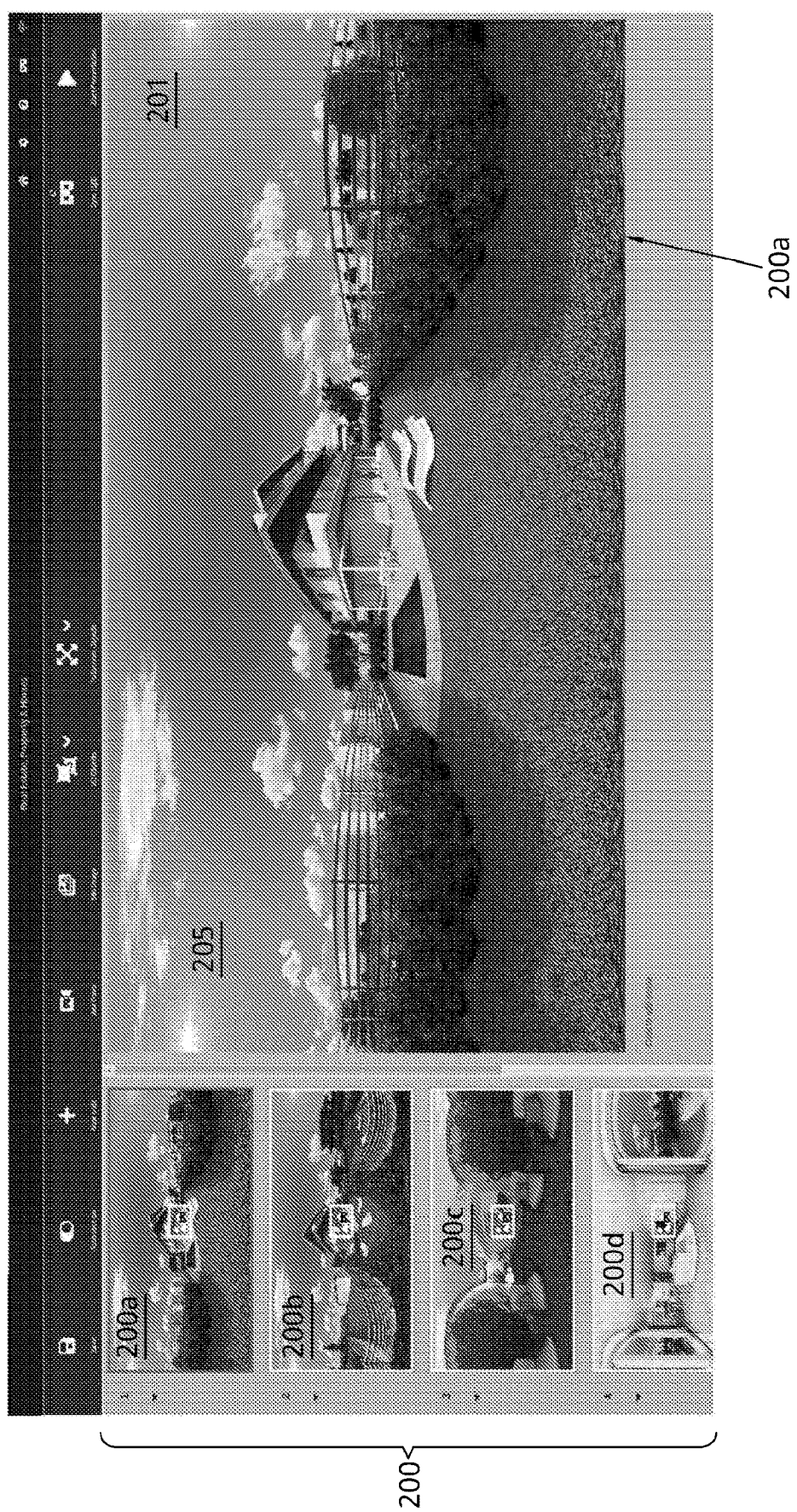
FIG. 12 shows the Web interface of FIG. 11 with base content for a presentation uploaded, which can then be synced to one or more audience terminals and then presented by the presenter/trainer.

The presentations described herein are structured and organised in a specific manner. Each presentation 200, as illustrated for example in connection with FIG. 12, comprises base content 201 and interactive information 202 (seen in FIG. 13). The base content can take various forms, such as, only as an example VR content 201 suitable for any the VR terminals such as the VR terminal 101 of FIG. 1, but also other forms, such as, only as a further example, a live stream of imagery captured by the live camera 103 of the AR terminal 102 of FIG. 1. The VR content 201 can be selected from a number of VR media 205, as also referenced in FIG. 12. FIG. 12, for example, shows a presentation 200 which includes a plurality of presentation slides 200a, 200b, 200c, 200d. Each presentation slide 200a, 200b, 200c, 200d may include a different VR medium 205. In the example shown in FIG. 12, the VR media 205 are all in the form of 3D images showing different aspects of a property (exterior, in the case of slides 200a, 200b and 200c; interior, in the case of slide 200d). However, different VR media 205 would be possible, such as 2D photos or videos, or 3D objects.

Figure 13:
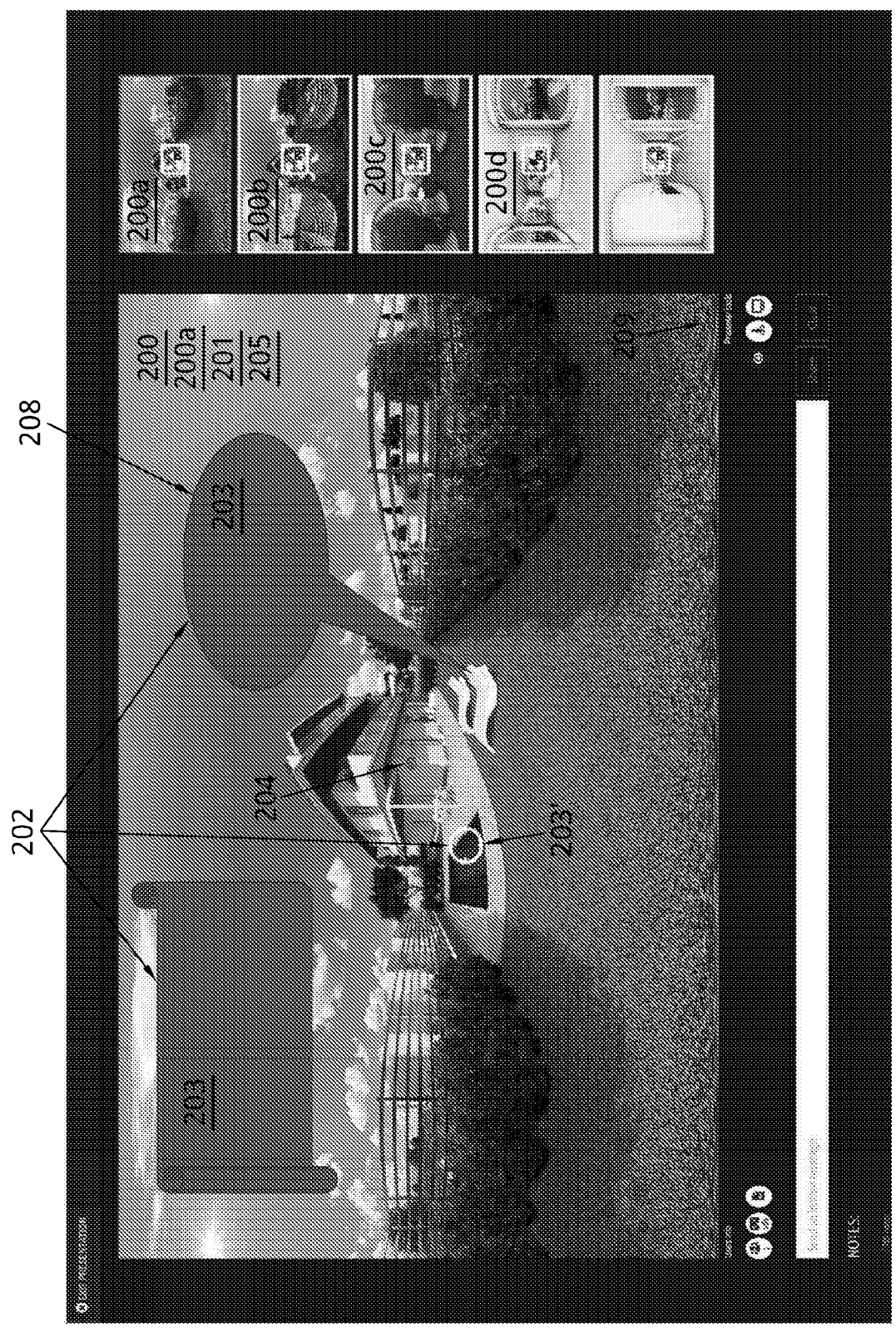
FIG. 13 shows the Web interface of FIGS. 10 and 11 with the presentation system in the presentation mode referred to in FIGS. 7 and 8A, while the presentation of FIG. 12 is being presented by the presenter.

As described above, in addition each presentation includes interactive information 202. This interactive information 202, in other words one or more digital assets that can take many different forms, is incorporated by an author (who could be the presenter P, or another third-party creator) into the presentation 200 at the time of creating the presentation 200 (for details of which, reference is made further below in relation to FIGS. 3 and 4). Therefore, the options available to the presenter P for interacting with the audience U during the presentation 200 are, effectively, predetermined at the moment of creating the presentation 200. In the context of the present applications, especially in the context of training the users U, this is considered to be satisfactory, since at the moment of creating the predetermined presentation 200 a deliberately large number of interactive elements 203 (also referenced in FIG. 13) collectively forming the interactive information 202, as shown in FIG. 13, can be included in the predetermined presentation 200. FIG. 13 schematically shows only a few different interactive elements 203 for reasons of clarity. The presenter P can then choose which interactive elements 203 to use to interact with the users U while the predetermined presentation 200 is being presented to its audience at any one time, and has full management of the interactive elements 203 from the PC 1. It will be understood that the presenter P is not bound to using all the interactive elements 203 in each presentation session, or to using them in any predetermined order or sequence. The presenter P can instead chose which tools to use for interaction with the users U at any one time, which choice may be determined by feedback provided by the users U to the presenter P via the interactive feedback 204.

Figure 14:
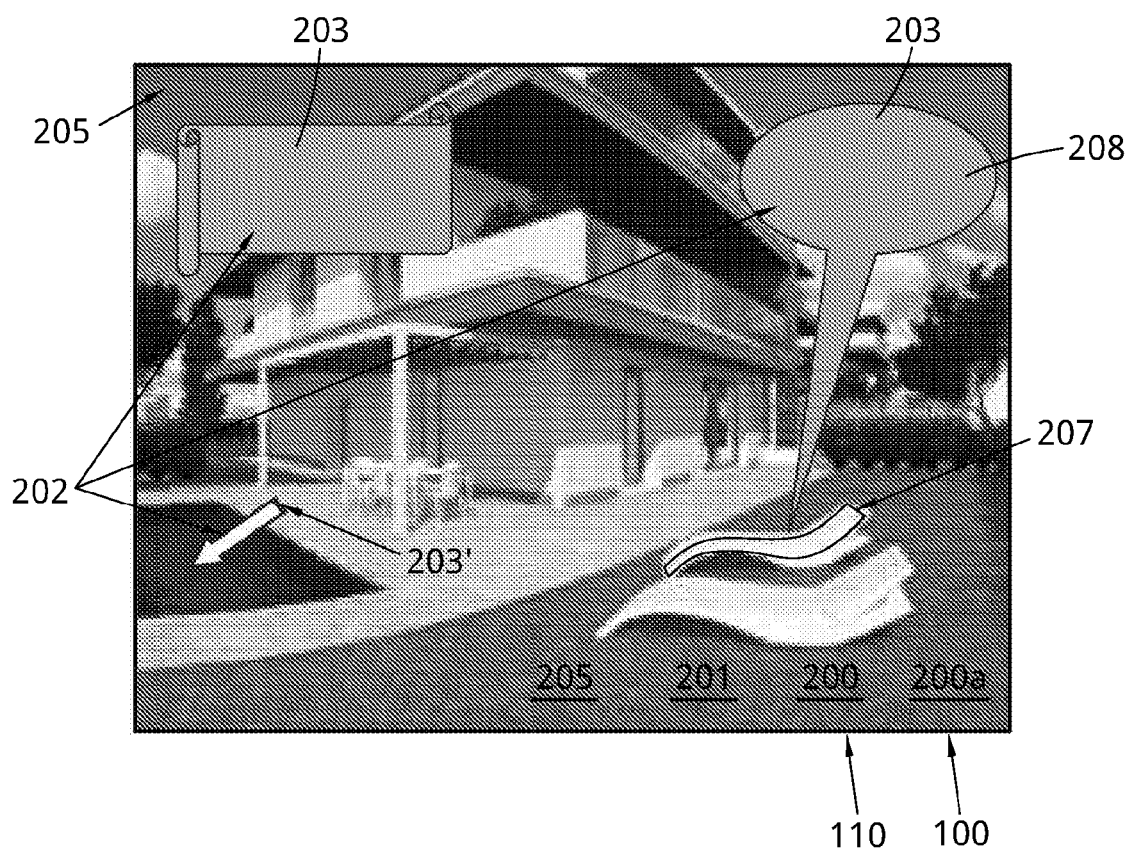
FIG. 14 shows an audience fruition environment from the presentation of FIGS. 12 and 13, as displayed by one of the audience terminals of a presentation system according to FIGS. 1, 3, 5, 7, 9 and/or 10.

With the wording "interactive information", we mean a collection of "interactive elements" or "digital assets" of and for the presentation 200, only some examples of which are described herein. The interactive information 202 can be used by the presenter P, if he/she so wishes, to interact with the users U during the delivery of the presentation 200, and can be delivered in a variety of manners, usually, but not solely, with a selected interactive element 203' being delivered simultaneously to all users U at one time to direct and improve the learning and understanding of the students/trainees during the presentation, in a training scenario. This interaction is represented (on the presenter side) by a circular indicator in FIG. 13, which indicates to the users the position of a swimming pool. This circular indicator may correspond to a different shape on the user's side—in this case an arrow 203' as shown in FIG. 14. Alternatively, or additionally, any number of interactive elements 203, could be used sequentially, with or without gaps between one and another, and be addressed to all terminals or any selected terminal subgroups—the options could be many.

The non-interactive content of the presentation 200, for example the VR content 201 referred to above, is by contrast always outputted to the users U on the VR/AR terminals 100 during a presentation session—even though it will be appreciated that a single presentation may contain multiple slides 200a, 200b, 200c, 200d, as described above, and each slide may contain different base content 201. Once a slide has been selected by the presenter P though, its base content, for example the VR content 201, will be displayed. By contrast, interactive elements 203 of the interactive information 202 originally embedded into the presentation 200 are instead outputted on the VR/AR terminals 100 exclusively upon generation of a request or command forwarded (via the PC 1) by the presenter P.

Now that the structure of the presentations 200 described herein has been discussed, further features of the presentation software suite 20 can be introduced. With continued reference to FIG. 2 (which it is recalled refers to a local server version of the presentation unit 10), the presentation software suite 20 includes a communication software package 22 and a delivery software package 21. In this implementation, the communication software package 22 is configured to cause the processor 13 to perform second processes 40 (referenced for example in FIGS. 8A and 8B), which are distinct and not to be confused with the first processes 30 described above (and shown in FIG. 6). These second processes 40 are generally related to the management of the interactive information 202 and the interactive feedback 204 described above. Accordingly, the second processes 40 are enabled by the following conditions:

Condition 1) if a required presentation 200 has been received by each VR/AR terminal 100 in the audience (this means that all VR/AR terminals are ready to output the presentation to the respective users U); and, Condition 2) if the required presentation 200 is being presented to the users U on their respective VR/AR terminals 101, 102 (that is, if the presenter has started the presentation by providing a corresponding command on the computer 1; FIG. 12 on the top-right corner shows a button available to the presenter to do start the intended presentation 200 on the connected terminals 100).

Figure 7:
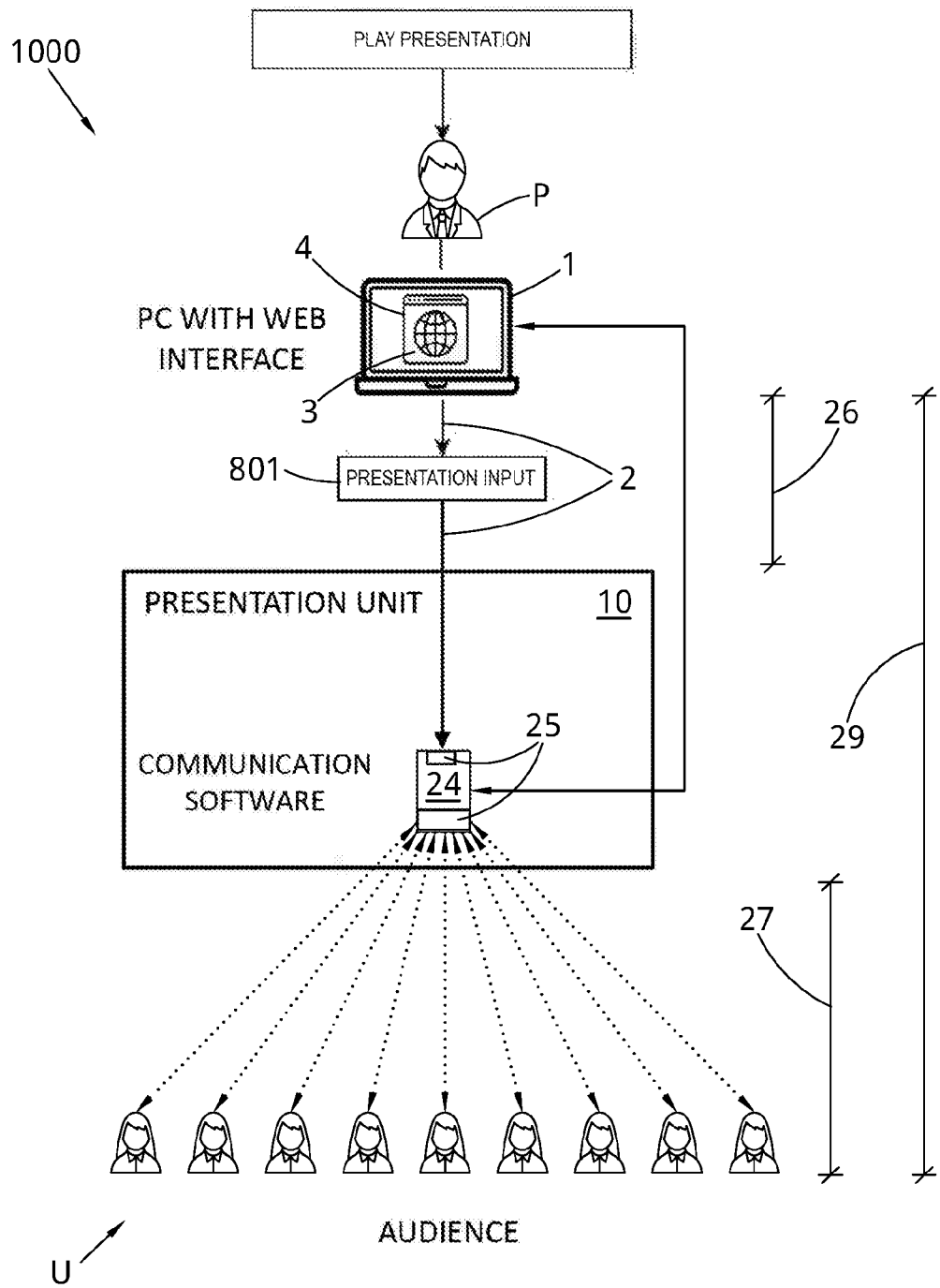
FIG. 7 is a system diagram showing the functioning of a presentation system according to FIGS. 1, 3 and 5 in a presentation mode.
Figure 8A:
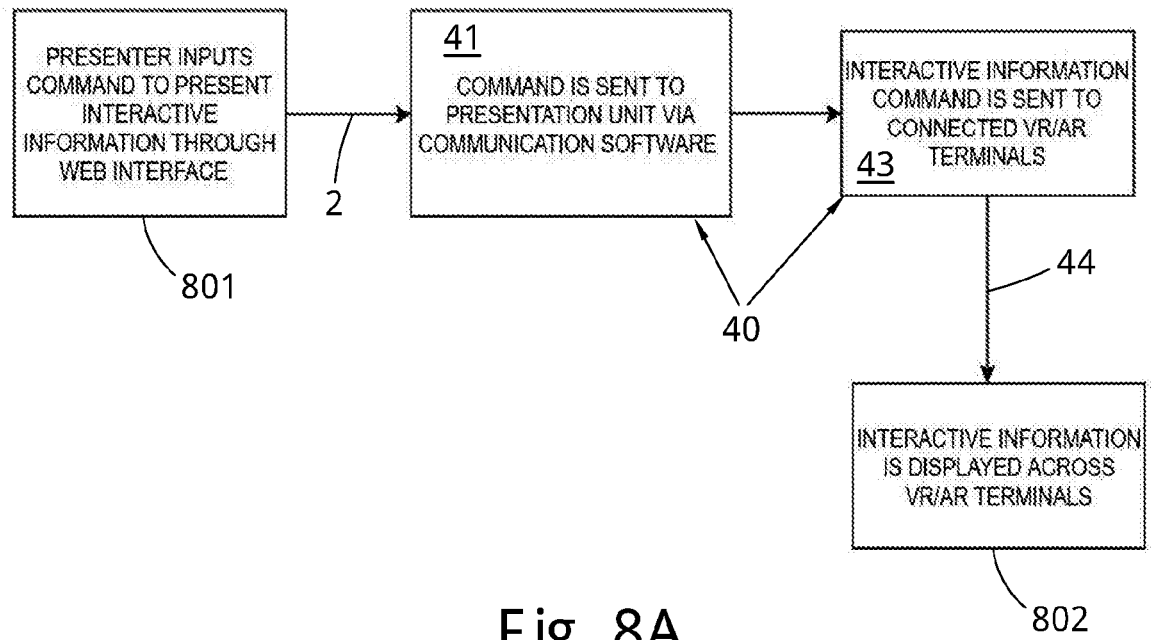
FIG. 8A is a flow chart that illustrates a presenter/trainer presenting to an audience using a presentation system according to FIGS. 1, 3, 5 and 7 in the presentation mode referred to in FIG. 7.
Figure 8B:
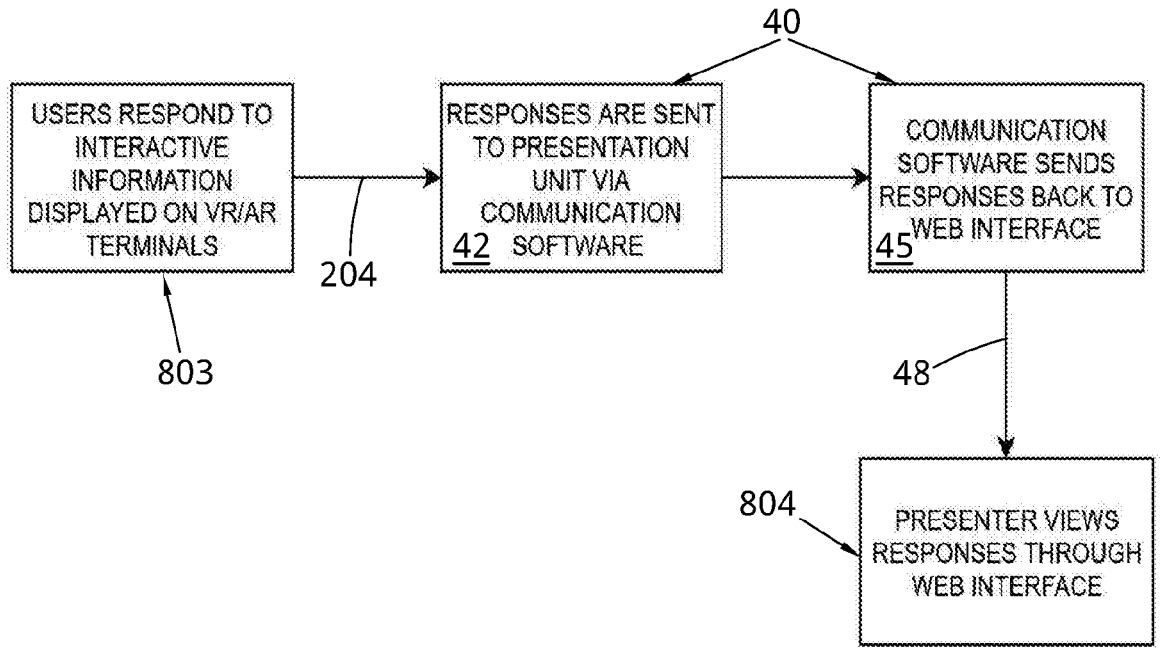
FIG. 8B is a flow chart that illustrates users/trainees of a presentation system according to FIGS. 1, 3, 5 and 7 interacting with a presentation via respective audience terminals also part of said presentation system.

FIGS. 7, 8A and 8B show, respectively, the set up of the system 1000 during a presentation session run by the presenter P and block diagrams representing the two-way presenter-user interaction enabled by the VR/AR presentation systems 1000 described herein. Accordingly, in a presentation session, a required presentation 200 is presented by a presenter P using a presentation unit 10 as described herein. The second processes 40 include at least one of the following:

i) receiving 41 one or more commands 2 to output corresponding one or more elements 203 of the interactive information 202 which is part of the required presentation 200, said one or more commands 2 having been generated by the presenter P using the computer 1;

ii) receiving 42 interactive feedback 204 generated by one or more of the users U using the respective VR/AR terminals 100;

iii) transmitting 43 a first set of instructions 44 to each VR/AR terminal 100 to output the one or more elements 203 referred to above; and iv) transmitting 45 a second set of instructions 48 to the computer 1 to output the interactive feedback 204.

Each of the above processes i)-iv) relates to the interactive aspect of the presentations 200 described herein.

As shown in FIG. 8A, the presenter executes the intention of showing the selected interactive element 203' by inputting 801 corresponding one or more commands 2 on the PC 1. The outcome of this operation is the display 802 on the VR/AR terminals 100 of the selected interactive element 203', as shown for example in FIG. 14. As shown in FIG. 8B, the users U may respond 803 to the selected interactive element 203' by performing appropriate actions on the VR/AR terminals, for example by depressing a button. The outcome of this operation is the presenter viewing 804 the interactive feedback 204 on the computer 1, as exemplified in FIG. 13. In FIG. 13, the interactive feedback 204 information takes the form of the centre of a field of view as viewed by a given user during the presentation. This information informs instantly the presenter P as to where the user U is looking.

As used herein, it will be understood that the term "instruction" has broad meaning, encompassing any suitable form of electronic signals, data or events that may be transmitted from the computer 1 to the presentation unit 10 or from the presentation unit 10 to the VR/AR terminals 100 for the intended purposes. The precise form of such instructions may depend on specific aspects of the computer 1, presentation unit 10 and the VR/AR terminals 100 and any software installed therein, including any operating systems. These aspects are not discussed further in the present specification.

It will likewise be understood that the terms "command" and "feedback" as used herein also each have broad meaning, representing any suitable form of electronic signals, data or events that may be exchanged between the computer 1 or the VR/AR terminals 100 in the direction of the presentation unit 10, respectively.

Figure 9:
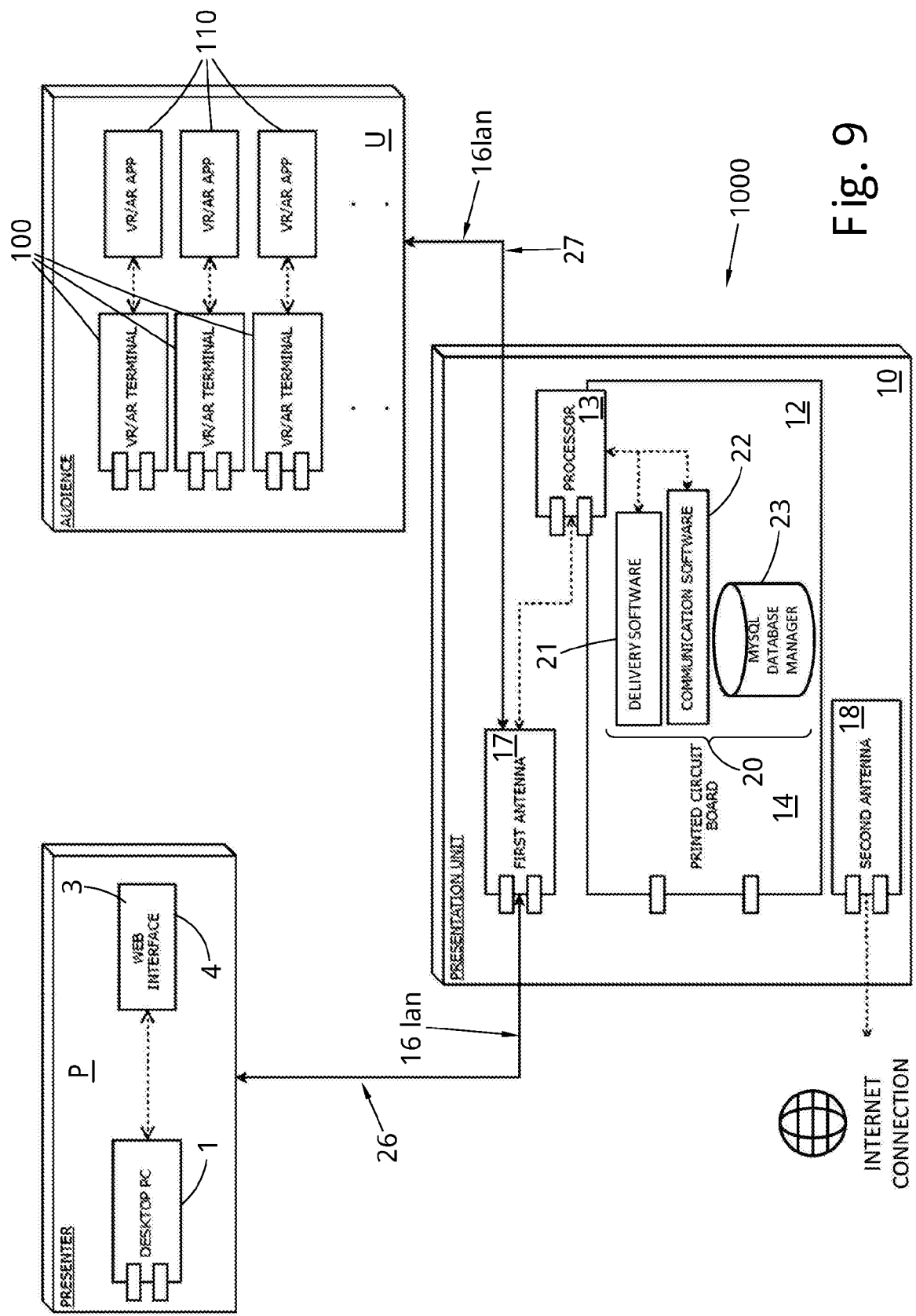
FIG. 9 is a block representation of a local server version of a presentation system according to FIGS. 1, 3, 5 and 7.

Returning now to FIG. 2, in accordance with the configuration of presentation unit 10 as a local server, the presentation unit 10 includes networking apparatus 15 in the form of a first antenna 17 for wirelessly communicating across the local area network (LAN) 16*lan*. The corresponding, complete presentation system 1000 is illustrated in FIG. 9.

In the described presentation unit 10, the antenna 17 provides a single access point to the local network 16*lan*, which means that all the system devices connect to the presentation unit 10 through the first antenna 17. This of course offers advantages from the point of view of privacy and security of the presentation system 1000. The networking apparatus 15 also includes a second antenna 18 for connecting the presentation unit 10 to the Internet. The computer 1 may obtain access to the Internet through the presentation unit 10 (known as "piggybacking"), if required. This may be advantageous because all the software stored in the presentation unit 10 can then be constantly updated, and the computer 1 and terminals 100 may accordingly always have access to the latest software.

Figure 10:
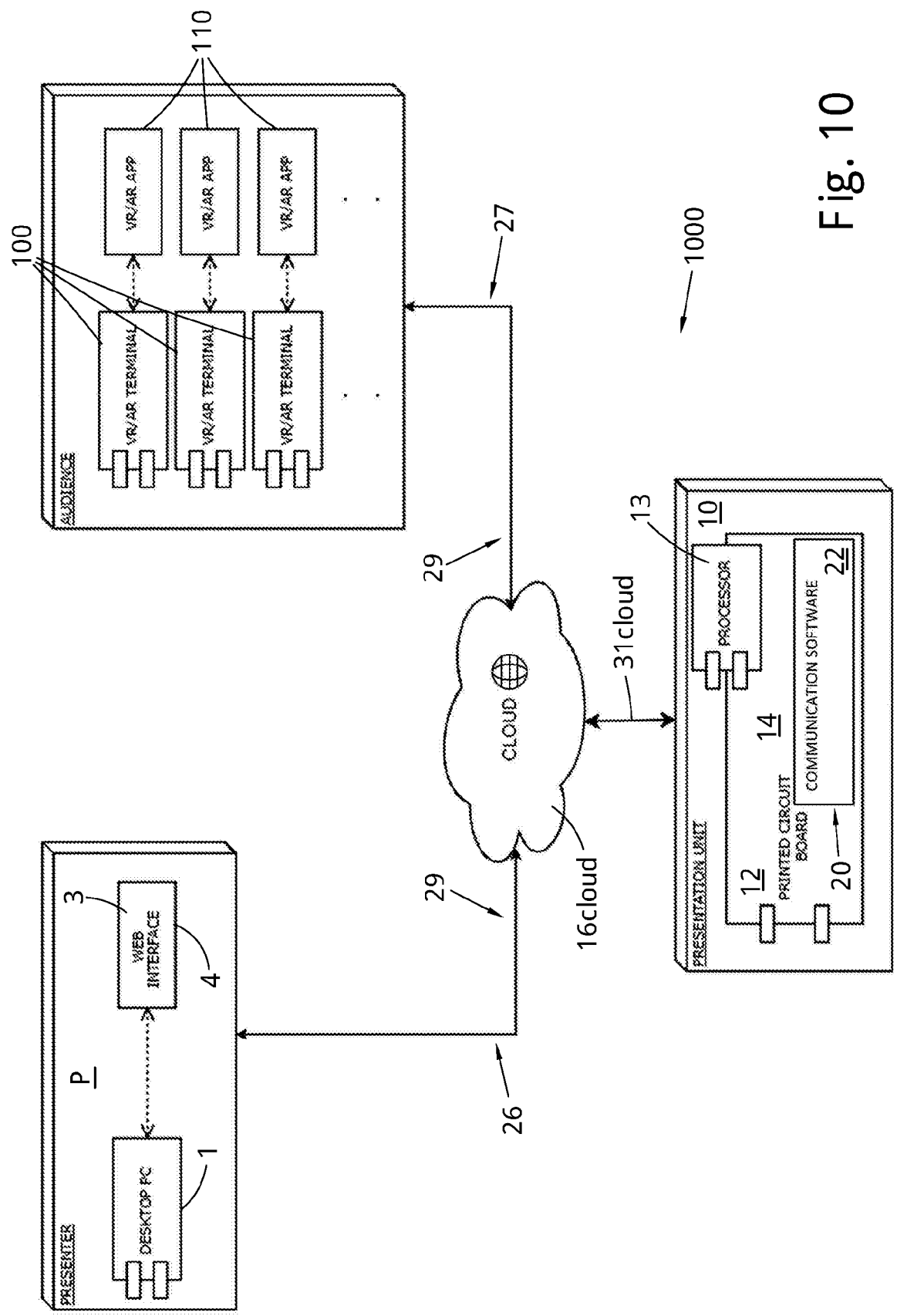
FIG. 10 is a block representation of a Cloud version presentation system according to other embodiments of the invention.

Alternatively, the presentation unit 10 can be configured as a Cloud server, and the network with which the presentation unit 10 communicates with the other devices 1, 100 can be the Internet 16*cloud*. FIG. 10 accordingly shows an Internet based presentation system 1000. It will be appreciated that the system 1000 shown in FIG. 10 is equivalent to that of FIG. 9, but for the network used in these systems and consequential software arrangements.

Accordingly, the Cloud server version presentation unit 10 of FIG. 10 is still equipped with presentation software but dispenses of the delivery software package 21. The function of the delivery software package is instead carried out within the Internet 16*cloud*. Accordingly, the Internet provides the necessary content to the VR/AR terminals 100 to be used for the presentation. However, the presentation unit 10 retains the communication functions of the presentations software, and more specifically all the functionalities of the communication software package 22, overseeing syncing of the terminals and providing the platform for running the presentations and interacting with the users U, which, in this scenario may be located in different parts of the World and still share the presentation experience together.

To illustrate the differences between the LAN version and the Internet version of the presentation unit 10, it is observed that the software component represented in FIG. 2 in solid lines (ie, the communication software package 22, which is part of the overall presentation software suite 20) is present in both described implementations of the presentation unit 10, ie the local server version of FIG. 2 and in the Cloud server implementation of FIG. 10. By contrast, the delivery software package 21 is optional in the Cloud server configuration of the presentation unit 10, and is accordingly represented in FIG. 2 in broken-up lines to illustrate the possibility of removing such a module in the Could server presentation unit 10. In the system 1000 of FIG. 10, the delivery software package is not provided. However, the presentation software suite 20 still attends to a minimum number of first processes 30 related to the verification that the VR/AR terminals 100 to be used for the presentation have the required presentation files. A MYSQL database manager 23 is also provided as part of the presentation software suite 20 shown in FIG. 2, but this is merely an optional module to assist the retrieval and storage of presentation files in the memory 14. Accordingly, this feature is also represented in broken-up lines in FIG. 2.

Figure 6:
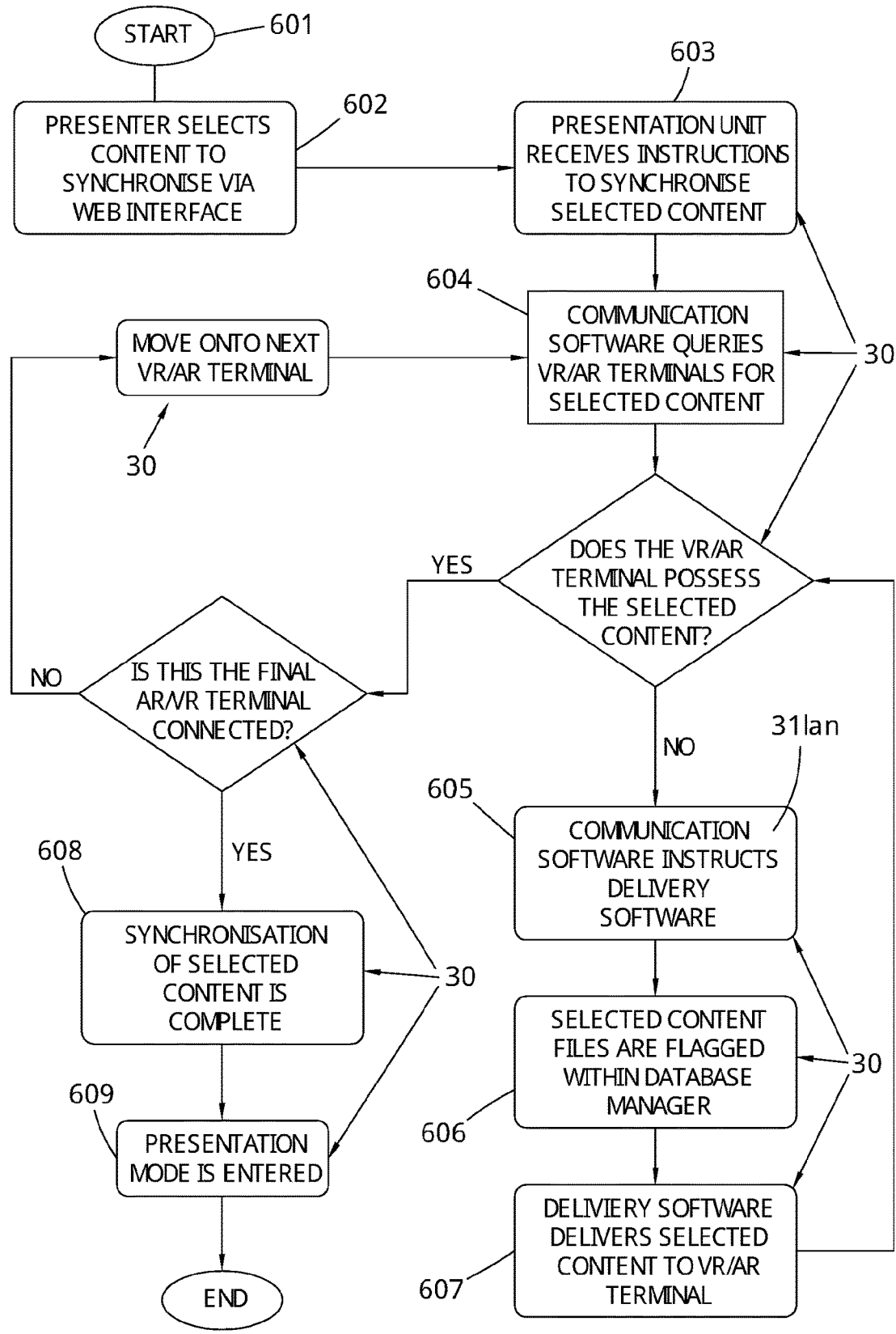
FIG. 6 is a flow chart that illustrates synchronizing a presentation system according to FIGS. 1, 3 and 5 in the synchronization mode referred to in FIG. 5.

With continued reference to FIG. 2 and referring in addition to FIG. 6, the role and function of the presentation software suite 20 can now be described in more detail. Recalling the first processes 30 for which the presentation software suite 20 is responsible, some examples are provided in FIG. 6 in connection with a presentation syncing mode of the VR/AR systems 1000. In FIG. 6, first processes 30 are each and all associated with the step of ensuring that the required presentation 200 is loaded onto the VR/AR terminals. Accordingly, the presentation unit runs first processes 30 in connection with receiving 601 instructions to sync selected content to the VR/AR terminals 100. This may result into full download of a new presentation or in the updating of an existing presentation already stored in the VR/AR terminals. Further first processes 30 are run by the presentation unit 10 to query 604 the individual terminals for the presence of the required content and, in the negative, to take steps 605, 606, 607 to deliver the required files to the terminals. When all the terminals have been queried, the syncing of the terminals is declared 608 as complete, and the presentation mode can be entered 609. In the presently described case of local server implementation of the presentation unit 10, it is the communication software package 22 which is tasked to sequentially interrogate the terminals 100, and if necessary, to instruct 605 the delivery software package 22 to deliver the required files. This is the process for the presentation software suite 20 to cause 31*lan* (referenced in FIG. 6) the appropriate content to become available to the terminals in the local server scenario.

In the case of the Cloud server implementation of the presentation unit 10, the first processes 30 still comprise, for example, directly or indirectly causing 31*cloud* (this is referenced in FIG. 10) the required presentation 200 to be transmitted to the VR/AR terminals 100, but in this case this happens from the Internet. As used herein, "directly" refers to first processes 30 that as an immediate result of execution cause the transmission of the required presentation to the VR/AR terminals 100 from the Internet. This may happen, for example, when the VR/AR terminals of interest are geographically located proximal to the presentation unit 10 (Cloud server version), and the presentation unit 10 stores the required presentation files in readiness for transmission. As used herein, "indirectly" refers to first processes 30 that as a non-immediate result of execution cause the transmission of the required presentation to the VR/AR terminals 100 from the Internet. This may happen, for example, when the VR/AR terminals of interest are geographically located distant to the presentation unit 10 (Cloud server version), and/or the presentation unit 10 does not store the required presentation files in readiness for transmission. Instead, the presentation files may be part of a Content Delivery Network (CDN), part of the Internet.

It will be clear that other activities related more or less closely to the presentation files may be attributed to the first processes 30 instigated by the presentation software suite 20. For example, the presentation software suite 20 may be responsible for carrying out checks as to whether the VR/AR terminals 100 each have obtained the required presentation 200. If any of the VR/AR terminals 100 do not store the required presentation 200, then the presentation software suite 20 may send instructions over the Internet so that a CDN provides the required presentation 200 to the VR/AR terminals 100.

In the LAN implementation of the presentation unit 10, the communication software package 22 is more specifically be the module responsible for carrying out checks as to whether the VR/AR terminals 100 each have the required presentation 200 and, in the negative, the communication software package 22 causes 31*lan* (as referenced in FIG. 6) the predetermined presentation 200 to be transmitted to the one or more VR/AR terminals 100 from the memory 14 of presentation unit 10.

In some LAN implementations, the delivery software package 21 is configured to transmit 32 the required presentation 200 to the VR/AR terminals 100 upon receiving a corresponding trigger 33 from the communication software package 22. This is an interesting feature, shown in FIGS. 5 and 6, since it enables an advantageous manner of synchronising the VR/AR terminals 100, that is ensuring that each VR/AR terminal 100 locally stores the required presentation 200 before the presenter P can play the presentation 200. The role of the database manager 23, which may be a MYSQL database manage as described above, is to assist the delivery software package 21 in retrieving the required presentation files from the memory 14.

In the described LAN versions of the presentation unit 10, the delivery software package 21 is configured to utilize a conventional communication protocol for transmitting 32 the predetermined presentation 200 to said VR/AR terminals 100. In particular, in the described LAN versions of the presentation unit 10, said conventional communication protocol is HTTP. It will accordingly be understood that the delivery software package 21, in this versions of the presentation unit 10, essentially works as a Web server which is in charge of providing the required content to the VR/AR terminals 100 in preparation for the presentation.

Figure 3:
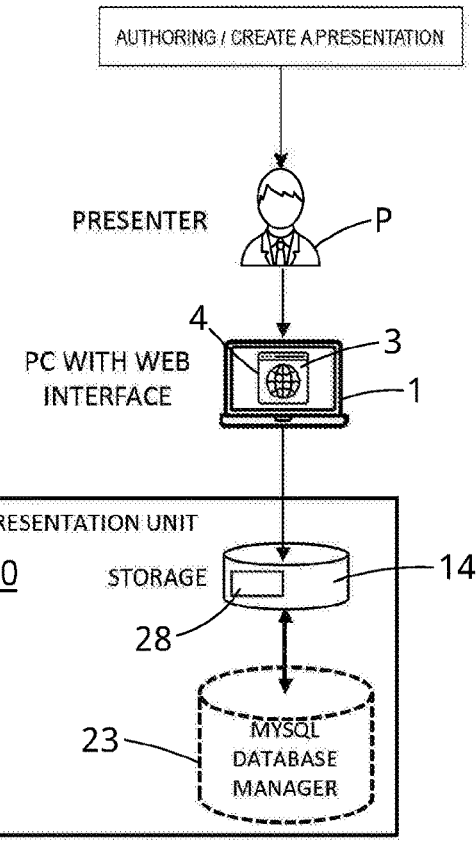
FIG. 3 is a system diagram showing the functioning of a presentation system according to FIG. 1 in a presentation authoring mode.

Referring now to FIG. 3, there is schematically represented the presentation system 1000 of FIGS. 1 and 2 in presentation authoring mode (the VR/AR terminals are not shown since they are not relevant in this function). The presentation software suite 20 additionally includes a presentation management package 28 to aid with the creation of presentations templated as described herein. The presentation management package 28 includes files which provide the computer 1 with an interface 3 for creating presentations 200 as described herein. These files are accessible from a conventional Web browser 4 installed on the computer 1. Accordingly, the interface 3 can be referred to as a Web interface.

Figure 11:
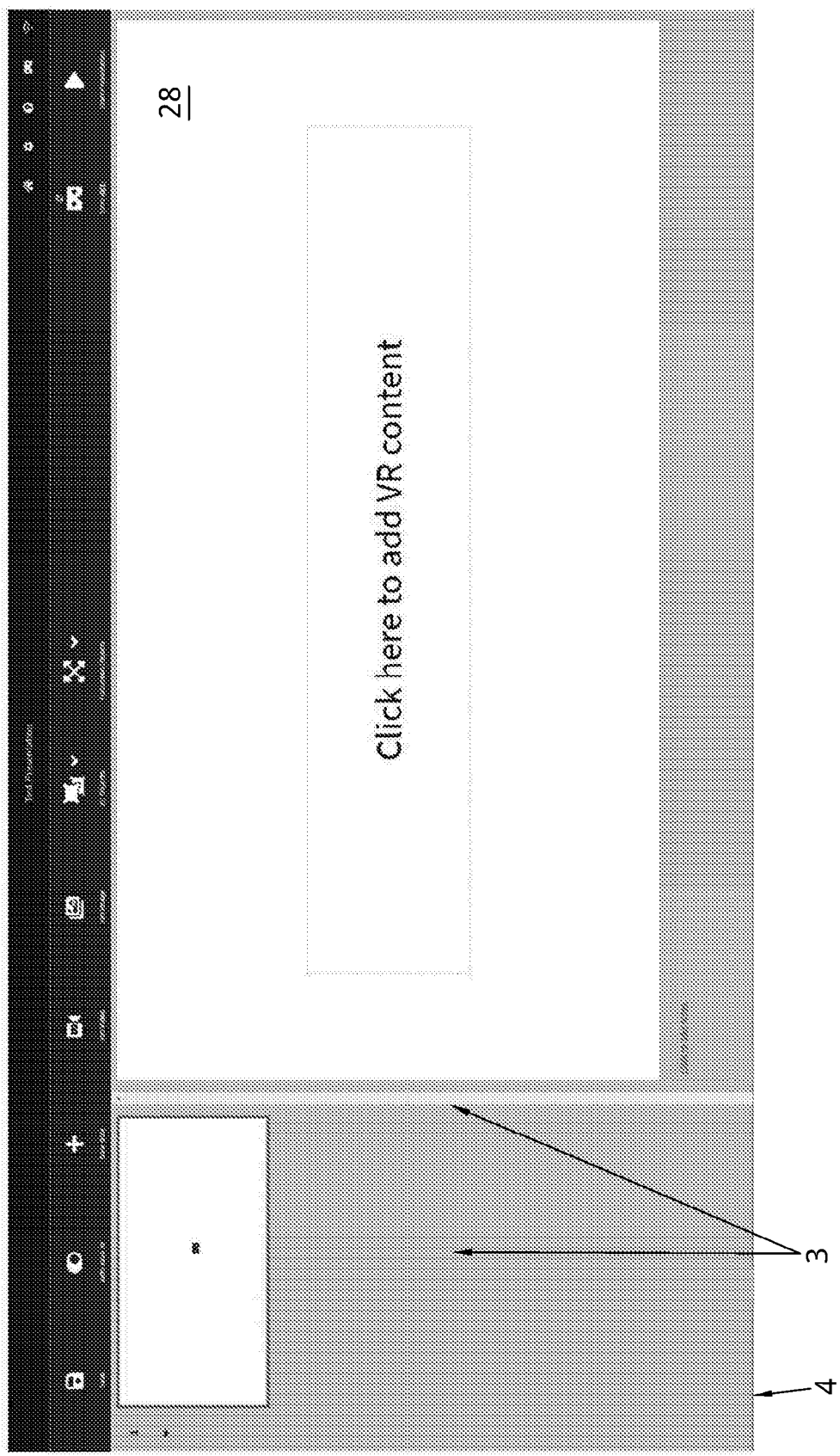
FIG. 11 shows a Web interface that may be used by a presenter/trainer to upload presentation content in the presentation authoring mode referred to in FIGS. 3 and 4.

Certain detail features of the presentation creation (and/or editing) interface 3 are shown in FIG. 11 and are generally similar to features conventionally included in commercial presentation creation and editing programmes. Accordingly, the presenter P is able to prepare one or more presentations by assembling together presentation contents. As described above, FIG. 12 shows VR content 201 as an example, suitable for VR terminals 101. However, other forms of contents are possible such as, as also described above, images captured by the camera 103 of the AR terminal 102. In addition, the presenter P can edit pre-existing presentations. At the stage of creating a presentation the presenter P also adds interactive elements 203 that together form the interactive information 202 which the presenter can use to interact with the users U during the presentation. Referring to FIG. 13, the presenter P has, for example, selected to include in the presentation a quiz, a position indicator and a text box as examples of interactive elements 203 (shown in FIG. 13 as if they had been used simultaneously by the presenter). Only upon execution of corresponding commands 2 on the computer 1, the selected interactive elements 203 are visualised to the audience. Once the presenter has completed creating the presentation, the MYSQL database manager 23 is invoked to store the presentation in the memory of the presentation unit 10 in optimised manner.

Figure 4:
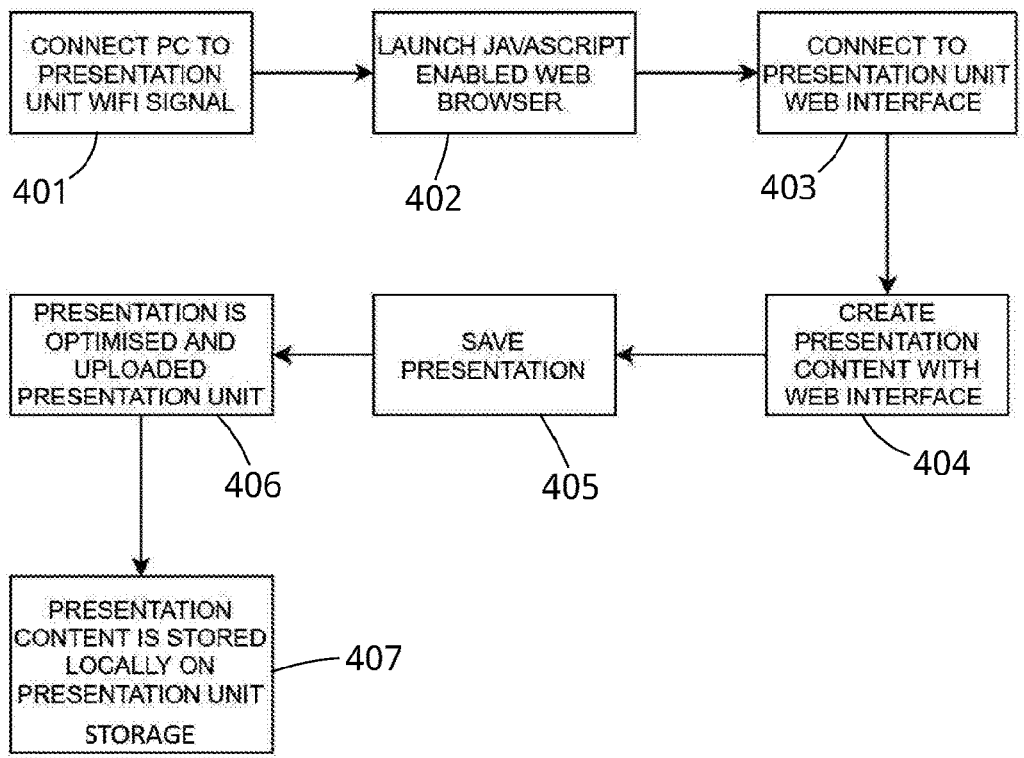
FIG. 4 is a flow chart that illustrates setting up a presentation system according to FIG. 1 and authoring a presentation in the presentation authoring mode referred to in FIG. 3.

With reference to FIG. 4, which illustrates in block-diagram form the presentation authoring mode of FIG. 3, the presenter P first starts the presentation computer 1 and connects 401 the same to the presentation unit 10 via the first antenna 17 and the LAN network 16*lan* it provides. The presenter then initiates 402 the Web browser 4, which in the described example is Javascript enabled. The Web browser 4 is then used to access 403 files stored in the presentation management package 28 so that the Web interface is also initiated so that the presenter P an create 404 predetermined presentations, by uploading the required base content 201 and interactive information 202. When this operation is complete, the presenter saves 405 the presentation 200 by inputting corresponding commands on the computer 1. The presentation software package 28 receives these commands and accordingly optimises and uploads 406 the presentation 200 in said memory 14, which is done on cooperation with the MYSQL database manager 23. Finally, the presentation 200 is stored 407 locally in the presentation unit 10 (local server version).

Figure 5:
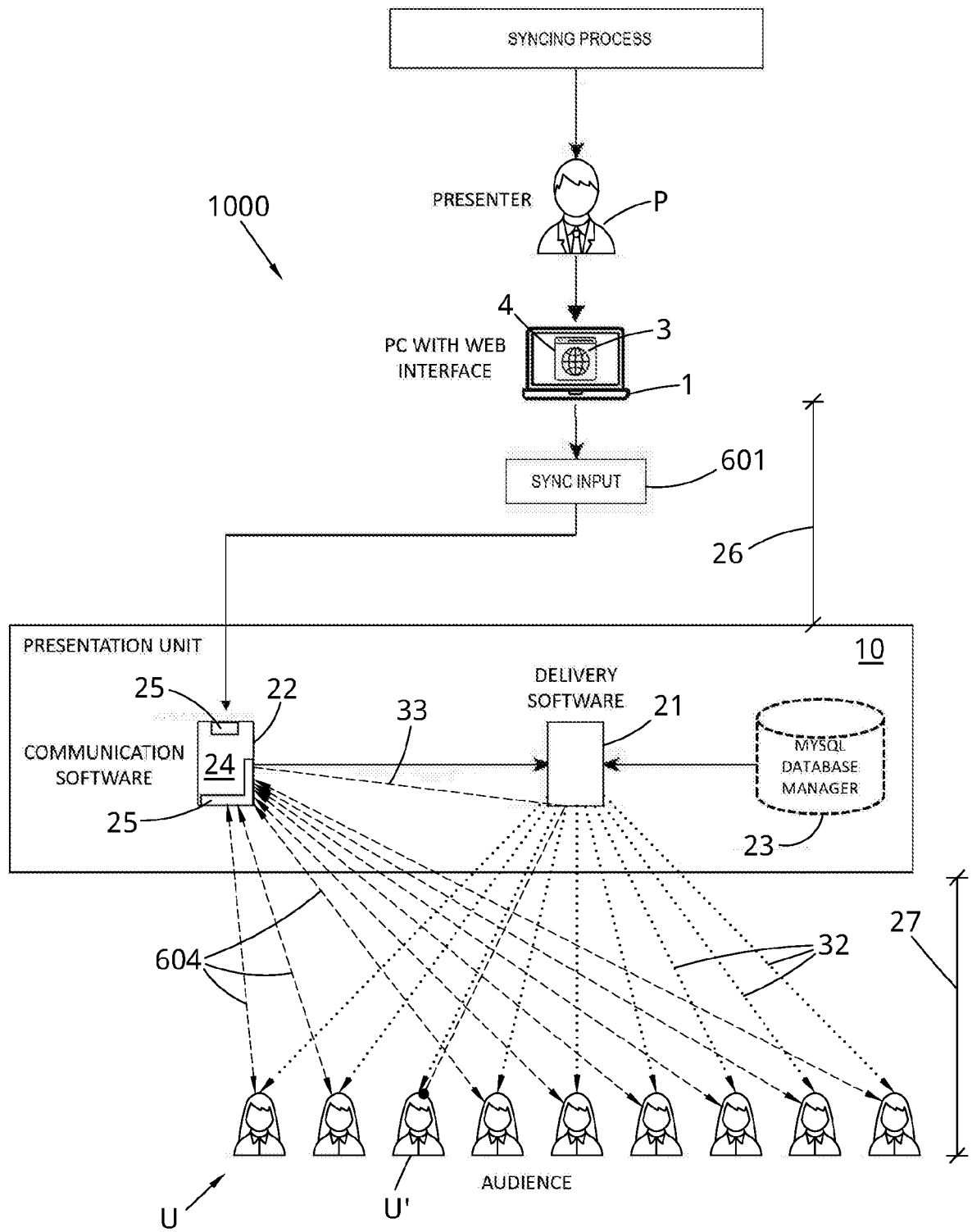
FIG. 5 is a system diagram showing the functioning of a presentation system according to FIGS. 1 and 3 in a synchronization (sync) mode.

With reference to FIGS. 5 and 6, there is represented the presentation system 1000 of FIGS. 1 to 4 in presentation synchronization (sync) mode. This function allows the system 1000 to prepare for the fruition of the presentation 200 by ensuring that all VR/AR terminals 100 have obtained the required presentation 200, and are therefore synced. As shown in FIG. 6, the process is started by the presenter P, who inputs 601 a corresponding sync command. The presenter P is then required by the Web interface 3 to select 602 the presentation (or presentations) for syncing. The presentation unit 10 receives 603 corresponding instructions from the computer 1, which instructions are then processed by the presentation software suite 20. The communication software package 22 then queries 604 the VR/AR terminals 100 sequentially in relation to the presence/absence of the presentations being synced in the VR/AR terminals 100. If the queried VR/AR terminal 100 does not possess the presentation, then the communication software package 22 instructs 605 the delivery software package 21 to deliver the required contents. Accordingly, the required files are flagged 606 by the delivery software package 21 in cooperation with the MYSQL database manager 23, and the delivery software package 21 delivers the required files to the VR/AR terminal in question, which is accordingly now synced 608. The presentation software suite 20 then enters the system 1000 in presentation mode (for which, see FIG. 7).

The sequential nature of the syncing process of FIG. 6 and the interplay between the communication and delivery software modules 21, 22 are best graphically represented in FIG. 5. The communication software package 22 is responsible for all communication between the computer 1, presentation unit 10 and VR/AR terminals 100. In the described implementation, the communication software package 22 is in the form of a socket server 24. A socket server 24 is a specific, dedicated computer programme which defines and manages one or more sockets 25 of the presentation unit 10. 'Socket' assumes herein the meaning know in the arts. Sockets are defined by an IP address and a port number. Sockets accordingly are, as known, tools which allow software modules to communicate between each other in any client-server architecture. In particular, in a preferred configuration a socket 25, as shown in FIG. 5, is dedicated to all communications between the computer 1 and the VR/AR terminals 100 during the sync phase and during a presentation session (described herein with reference to FIGS. 7 and 8).

As also shown in FIG. 5, a first communication channel 26 is dedicated to communication between the computer 1 and the presentation unit 10 and terminates at the presentation unit end with the socket 25. A second communication channel 27 is dedicated to communication between the presentation unit 10 and said VR/AR terminals is instead defined between the socket 25 and the VR/AR terminals 100. Accordingly, the communication software package 22 (that is, in the preferred implementation, the socket server 24) also logically defines a third communication channel 29 (first referenced in FIG. 7) for communication between the computer 1 and said VR/AR terminals 100 which is the sum of the first and second communication channels 26, 27. Each communication channel 26, 27, 29 is logically assigned by the socket server 24 to communication between corresponding pairs of the computer 1, presentation unit 10 and VR/AR terminals 100. In FIG. 5, a specific user U' does not possess the required presentation 200. Accordingly, after query, the socket server 24 instructs 33 the Web server to transmit 32 the required content to the corresponding terminal 100.

The described socket server 24 uses a custom communication protocol for the corresponding operations of receiving 41, 42 and/or transmitting 43, 45. This protocol can thus be optimised for the task, which is particularly advantageous.

In an AR implementation of the concepts described herein, the predetermined presentation 200 comprises one or more markers 207 (shown in FIG. 14) for instigating output on a corresponding AR terminal 102 of a selected asset 208 of said one or more elements 203 of the interactive information 202. The camera 103 of the AR terminal 102 can then be used to detect such a marker, which can be done in 'live' conditions, and the selected digital asset 208 can accordingly be placed onto the scene at the location of the marker 207. In FIG. 14, the marker 207 is represented as a predetermined shape. However, different types of markers are possible, for example Global Positioning System (GPS) coordinates, if the AR terminal 102 is GPS enabled. Yet further types of markers 207 may however be possible.

The interactive information elements may comprise one or more of: a text, a shape, a position indicator and an interactive feature such as a poll, a quiz or a game. The interactive feedback 204 is produced in connection with one or more user feedback tools 209 selected only as an example from one or more of: a field of view detector, a direction of view detector, a feedback signal generated by interaction of the user with a feedback feature of the respective VR/AR terminal 100, such as a response to a poll or a quiz, and information related to the status of the respective VR/AR terminal 100 such as a charge status of the VR/AR terminal 100 if the VR/AR terminal 100 is battery operated.

The second processes 40 further comprise receiving one or more navigation inputs generated by the presenter P using the computer 1; and transmitting a third set of instructions to at least a subgroup 104 of the VR/AR terminals 100 so that said subgroup 104 simultaneously outputs a selected presentation slide 200*a*.

A method of presenting a presentation using a presentation system 1000 is described with reference to FIGS. 7, 8A and 8B. The method comprises, using the communication software package 22 available in both the local server and Could server implementations of the presentation unit 10, performing the receiving 41, 42 and transmitting 43, 45 actions described herein.

A method of providing a presentation to a plurality of VR/AR terminals using a presentation system 1000 is described with reference to FIGS. 5 and 6. The method comprises using the communication software package 22, sequentially interrogating 604 the VR/AR terminals 100 about the presence on each VR/AR terminal 100 of a predetermined presentation 200; directly or indirectly, causing 31*lan*, 31*cloud* the predetermined presentation 200 to be transmitted to one or more of the VR/AR terminals 100, if said one or more VR/AR terminals 100 do not store or have access to the predetermined presentation 200; in the local server implementation, using the communication software package 22 to trigger the delivery software package 21 to transmit 32 the predetermined presentation 200 to the one or more of the VR/AR terminals 100. It will be understood that delayed members of the audience, that is users that have not been able to synchronize their devices during an initial synchronization phase as shown in FIGS. 5 and 6, but wish to join a running presentation, would still be able to do so. Accordingly, the late comers would signal their presence to the presentation unit, and/or the presentation unit may periodically or continuously check for the presence of late comers. Once the presence of one or more late comers has been identified, then the system delivers the required presentation content to the late comers. This may be the entire presentation content previously delivered to the other users, or may be a partial presentation content, sufficient for the late comers to participate in the remainder of the presentation. Once delivery of the content is complete, which delivery is carried out as described herein, then the late devices will join the presentation, which may happen, as the case may, be in connection with a presentation slide being currently presented, or in connection with a subsequent slide. The choice may depend on the content being currently presented. If the VR medium 205 is, for example, a 2D or 360 degrees image, then access to the presentation may be granted immediately; if the VR medium is a 2D or 360 degrees video, then access may be granted starting from the next slide.

A discussion of the potential advantages and improvements brought about by the units, systems and methods described herein is now presented, with continued reference to FIGS. 1-10.

The presentation units and systems described herein are provided as combined software and hardware solutions with the aim to provide an improved presentation experience to an audience, such as a group of trainees.

The presentation systems comprise a personal computer, a presentation unit and a plurality of suitable terminals. The personal computer is generally in the form of a portable computer. However, any alternative computers or computerised devices could be used, such as a desktop computer or tablet.

The presentation unit is the key component of each system and has therefore ben described in detail herein in two different but functionally equivalent versions: a local server version and a Cloud server version. The main purposes of the presentation unit are to take steps to ensure that all terminals are provided with the required presentation, and then to provide features to the presenter whereby the presenter during a presentation can control the presentation itself and interact in the desired manner with the trainees. The interaction can be in both ways, ie from the presenter to the trainees/students, and from the trainees/students to the presenter, and in any case this interaction is computationally streamlined and therefore not subject to problems such as interruptions, latencies etc.

In the case of VR presentations (but, as explained, the technology is equally adaptable to AR presentations), each presentation comprises VR content in the form of one or more VR media, which may be arranged in presentation slides and in addition a number of elements collectively forming interactive information embedded in the presentation and that can be used to guide the experience of the users while the presentation is presented. The described VR terminals are in the form of VR headsets. These are available, for example, from Pico Interactive Inc., although similar devices can be sourced elsewhere. These devices could be all-in-one virtual reality goggles or smartphone-based virtual reality headsets.

A presenter P operates on the computer via a Web interface program. The Web interface allows the creation of presentation content suitable for a VR/AR environment, and also the ability for the presenter to produce information to guide the audience through the presentation, thus enhancing the VR/AR experience. The hardware enables presentation content to be shown across the headsets (currently, up to 250—but this limitation is susceptible to be removed in future) simultaneously, without pre-buffering of content or lag. With this system, the presenter is able to control what is being displayed on the headsets (the presenter may decide which slide to present, in no particular order). Furthermore, during the presentation the presenter is able to provide additional instructions or interactive content to the audience members simultaneously, to which the audience members can respond to. This allows for improved reactivity and interaction between the presenter and the trainees, which may improve teaching and training.

The presentation unit appears as a box which houses the required hardware components. A printed circuit board or motherboard is powered by an electrical power supply system (not shown) and supports at least one processor at least one solid-state drive (SSD) memory, in most implementations. An operating system (in the described units, Linux Ubuntu) is installed in the presentation units and provides the required platform for the functioning of the hardware and software components, as known in the arts.

Among unique features of the units, systems and methods described herein are the following:

1. The synchronisation process: instead of relying on traditional media streaming methods for presentation sessions, the present disclosure provides a solution that delivers all the requested presentation content to all the connected devices prior the session begins, synchronising all the necessary media for the presentation beforehand.

2. Multi-channel communication: in order to make the processes involved in the presenting across multiple devices seamless and lag free, separate communication assets were custom designed to handle devices across different communication channels and specifically assigned to particular roles. As part of the synchronisation process, the delivery of the presentation content from the presenter to the audience devices is decoupled from the process of delivering the presentation to the audience. Further, the delivery of presentation content is handled through a known and widely accepted delivery protocol, whereas the interactive content and instructions mid-presentation are handled through a separate and bespoke communication protocol, which is thus susceptible to optimisation in relation to the specific tasks concerned.

3. Guided VR/AR experience: with these communications assets the units, systems and method described herein enable the presenter to guide the audience through the presentation content in real-time and interact with users inside the VR/AR environments by sending and receiving interactive content to all connected devices simultaneously.

FIG. 1 has shown the basic structure of the devices involved in the systems described herein. These systems comprise a personal computer, a VR/AR hardware presentation unit and one or more audience devices. Creating and presenting the presentation content is completed via the personal computer. The presentation unit in its local server implementation acts a s wireless connection terminal which comprises multiple software and hardware communication assets in order to establish a wireless communication route for instructions content delivery between the personal computer and the audience devices.

In the local server scenario, the first antenna enables the presentation unit to act as an access point by projecting a wi-fi signal to which the personal computer and audience devices can connect to. This creates a wireless local area network (WLAN) among the PC and the audience devices through which data transfer and device communication is handled. The second antenna is a supplementary antenna to allow the presentation unit to connect to a separate wireless network with internet access. This allows the presentation unit to establish a wireless internet connection such that when in operation, the PC connected via the first antenna can piggyback off this connection allowing the PC to be simultaneously connected to the presentation and have internet access. Internet access also enables the presentation unit to update the software assets onboard.

The solid-state drive contains all the software assets for the presentation unit. This comprises a delivery software package, a communication software package and a MYSQL database manager. The delivery software uses HTTP and is dedicated to the delivery of the presentation content. The communication software manages the cross-device communication between the PC, the presentation and audience devices. The communication software comprises sets of commands to order the connected devices to visualise content, which can be done in predetermined positions, time and sizes, or in specified positions times and sizes. The MYSQL database manager collects the presentation content stored in the SSD storage and organises it such that it can be easily accessed, managed and updated.

FIG. 3 is a representation of the systems involved in creating and saving presentation content suitable for VR/AR devices. The process involves a presenter, a PC with the Web interface, and the presentation unit. To create a presentation the presenter begins by connecting its PC to the wi-fi signal that is generated by the presentation unit. When connected, the PC is identified by the communication software as a presenter device. Due to local DNS settings the computer can open the Web interface through Javascript enabled browser. This provides the advantage of using an PC as a presenter device without the need of proprietary software. With the Web interface, a presenter can create presentations by adding slides, inserting 360-degree photos and videos, 2D photos and videos and can also create polls of quizzes for the audience to answer. Within the presentation toolset, the presenter can also add position markers and text boxes which can be dynamically controlled during presentation. Within the Web interface, presentation content is displayed in a flattened mode and the position marker and texts are attached through 2D positioning. After the presentation is created the presentation content is uploaded from the PC onto the presentation unit through where it is saved locally onto the SSD storage and the MYSQL database manager.

FIG. 4 is a flow diagram of the steps undertaken in creating and saving presentation content. A PC can be connected to the wi-Fi signal generated by the first antenna of the VR unit. Once connected, using the Javascript enabled Web browser, the Web interface can be accessed. The Web interface provides the necessary tool set for the presenter to create presentation content suitable for a VR/AR environment. Once completed, the presentation content is optimised and uploaded onto the VR unit where it is saved locally on the onboard SSD storage and MYSQL database manager.

FIG. 5 is a representation of the systems involved in synchronising presentation content onto the audience devices. This process delivers the necessary presentation content onto VR/AR devices prior to the presentation phase begins. Before initialising this procedure, the VR/AR devices are connected to the presentation unit by linking to the wi-fi signal generated by the presentation unit. Once all audience devices are connected, the presenter can select the necessary content to synchronise. An input is given through the Web interface on the PC which instructs the presentation unit to upload the presentation content stored in its local storage to the connected devices. An instruction is forwarded onto the communication software which sequentially (one device at a time) queries with the audience members whether they have the necessary content on board. The communication software checks with all the connected devices whether they have the necessary files for the presentation phase. Upon receiving notification from any connected devices that the files are missing, the communication software instructs the delivery software to upload the necessary files to that audience member from the MYSQL database. The synchronisation process is undergone sequentially (one by one) with the communication protocol checking with every audience member for the necessary presentation content. Once confirmation has been received that every connected device has received the necessary files, the presentation phase can begin. This instruction is sent from the communication software to the Web interface. The delivery of the necessary files through the delivery software is one of the reasons why the system is able to provide a lag free and seamless presentation as all the necessary files are delivered before the presentation session begins. The delivery software is dedicated to the delivery of media and is customised for data transfer operations. The communication software during the synchronisation process provides channel communication for every connected device for cross-device communication between the audience devices and the Web interface.

Via the communication software, the presenter is able to check through the Web interface information regarding the audience such number of devices connected and the progress of which devices have synchronised the selected presentation content.

FIG. 6 is a flow chart representation of the synchronisation process. The instruction to synchronise is initiated by the presenter via the Web interface. This instruction is received by the unit which utilises its communication software to sequentially query the connected devices about the presentation content selected. If the audience device possesses the content (eg, from a previous sync cycle), the next device is queried. If the audience device does not have the presentation content, the delivery software is called upon to upload the required content from the MySQL database onto the audience device. The communication software repeats the querying process to confirm synchronisation of selected content. After all connected devices are confirmed to possess the necessary presentation content, the synchronisation process is considered complete and the presentation phase may begin.

FIG. 7 provides a representation of the systems involved during the presentation phase of the system in order to provide a guided experience by enabling the presenter to control what the audience devices see and deliver interactive content to the audience in real-time. The presenter can also receive feedback/answers to the interactive content from the audience devices connected.

The presenter can insert presentation input of interactive content through the Web interface on the PC. The interactive content is shown across all connected devices simultaneously as an additional content layer on top of the on-going presentation content. The content input does not carry a large file size (a few kilobytes) and can be delivered swiftly and quickly to the audience members. The interactive content is optimized and configured for virtual reality or augmented reality environments within the Web interface on the PC. This information is sent to the unit which utilizes its communication protocol to deliver the necessary interactive content to all devices connected simultaneously. Within the VR/AR environment the interactive content may take the form of an arrow pointing in a certain direction, guiding the user to look at a particular feature of the presentation. The interactive content may also take the form of a poll question or quiz question which the VR devices connected can respond to in real-time. Audience information such as poll responses and viewing orientation and positional coordinate of the devices is delivered back to the Web interface through the communication protocol of the presentation unit, allowing the presenter to receive audience feedback regarding the focus viewpoint of the audience members and also the results of any poll questions asked. All of the interactions between the presenter and the audience members is managed via the communication protocol making the delivery of the interactive content quick and lag free.

Once the presentation ends, the content may be stored or deleted from the local storage of the VR devices and new presentation content may be synchronised. By keeping the content on the connected devices, the presenter removes the need for future synchronisation cycles and can directly go into presentation mode for that selected content. The content stored on board the devices is only accessible when a connected presenter selects the same content for presenting. Hence the presentation content, though might be stored locally on the devices, is not accessible without the presentation unit and connected presenter in place. The instructions to access and view the content can be only given by a connected presenter.

FIG. 8A is a flow diagram of steps taken by the presenter to showcase interactive content to audience devices connected. FIG. 8B is a flow diagram showing the steps taken by the audience members to communicate information back to the presenter in real-time. During the presentation phase the presenter may ask poll questions or quizzes in real-time which will appear within the VR/AR environment to all audience members. Using input keys for VR/AR devices, the audience members will respond to quiz questions which are then communicated back to the presenter via the presentation unit. All information communicated during presentation is handled by the communication protocol alone which transmits back the messages onto the Web interface. The presenter can then review this feedback content via the Web interface, and take any consequential actions regarding the progress of the presentation.

FIG. 9 is block diagram representation of the system architecture involved within a system employing a presentation unit configured as a local server. Within the presenter domain, the hardware involved is a desktop PC with a Javascript enabled Web browser to operate the Web interface. The presentation unit domain involves the first antenna, the second antenna and the local SSD storage which contains the software assets necessary to establish communication data delivery amongst the system devices. The first antenna is responsible for the data transfer and the delivery of content amongst all networked devices. The audience domain involves multiple audience devices with corresponding applications or "apps" installed thereon. The system provides cross communication between the presenter on a desktop PC and a plurality of the devices for audience users. The presentation unit contains the necessary software assets for creating VR presentation content and then synchronising a presentation onto the devices. Furthermore during presentation mode the unit handles the delivery of interactive content in real-time between the PC and the audience devices.

LIST OF REFERENCES 1 personal computer
P presenter (or trainer or teacher)
2 computer commands to output one or more elements of interactive information on VR/AR terminals
3 interface
4 Web browser
10 presentation unit
11 case
12 PCB
13 processor
14 memory
15 networking apparatus
16 network
16*lan* local area network (LAN)
16*cloud* Internet or Cloud
17 first antenna
18 second antenna
20 presentation software suite
21 delivery software package
22 communication software package
23 database manager
24 socket server
25 socket(s)
26 first communication channel
27 second communication channel
28 presentation management package
29 third communication channel
30 first processes
31 causing a presentation to be transmitted to VR/AR terminals
31*lan* causing a presentation to be transmitted to VR/AR terminals through a local area network
31*cloud* causing a presentation to be transmitted to VR/AR terminals through Internet
32 transmitting a presentation to VR/AR terminals
33 trigger generated by communication software package
40 second processes
41 receiving computer commands to output elements of interactive information
42 receiving interactive feedback generated by users
43 transmitting instructions to VR/AR terminals to output elements of interactive information
44 instructions to VR/AR terminals to output elements of interactive information
45 transmitting interactive feedback to a computer
48 instructions to computer to output interactive feedback
100 VR/AR terminals
101 VR terminal(s)
102 AR terminal(s)
103 camera
104 subgroup of VR/AR terminals
105 headset(s)
106 smart phone(s)
107 non-VR/AR terminal(s)
108 tablet(s)
110 VR/AR application
200 presentation
200*a*, 200*b*, 200*c* presentations slides
200*a* selected slide
201 VR content
202 interactive information for interacting with users during a presentation
203 elements of interactive information
203' selected element of interactive information
204 interactive feedback from users
205 VR medium
207 marker(s) for AR
208 selected asset of interactive information
209 interactive feedback tools
401 connecting a computer to a LAN via a wi-fi signal
402 starting a Web browser
403 starting a Web interface
404 creating a presentation using a Web interface
405 saving a presentation
406 optimising and uploading a presentation 407 storing a presentation on a presentation unit
601 starting a synchronization procedure
602 selecting presentation for synchronization
603 receiving instructions to synchronize selected presentation
604 interrogating a VR/AR terminal about the availability of a predetermined presentation
605 instructing delivery of a predetermined presentation
606 retrieving files of a predetermined presentation from storage
607 delivering a predetermined presentation
608 completing synchronization
609 entering presentation mode
801 inputting on a computer commands to interact with users during a presentation
802 outputting interactive information on VR/AR terminals
803 inputting user feedback on VR/AR terminals
804 outputting user feedback on a computer
1000 AR/VR system
U users (or trainees, or students)
U' interrogated user during syncing One or more embodiments according to the present invention have been described above with reference to accompanying Drawings in a non-limiting manner. The skilled person will appreciate that the invention may be carried out in a number of alternative ways, and accordingly protection is sought within the scope of the appended claims.

The invention claimed is:

1. A presentation unit for presenting to a plurality of VR terminals for use by respective users, the presentation unit comprising:
a case;
a printed circuit board (PCB) accommodated within said case, the PCB supporting a processor and a memory operatively connected to said processor;
a networking apparatus comprising:
    a first antenna configured for communicating with a computer and the plurality of VR terminals across a local area network; and
    a second antenna for connecting the presentation unit to the Internet; and
wherein the memory is configured to store presentation software configured to cause said processor to perform first processes for confirming a presence of a predetermined presentation on the plurality of the VR terminals, wherein the predetermined presentation comprises VR content comprising one or more VR media and interactive information comprising one or more interactive elements allowing a presenter to interact with the users during the predetermined presentation,
said presentation software further comprising communication software configured to cause the processor to perform second processes, distinct from said first processes, if:
    the first processes confirm via communications over the first antenna that the predetermined presentation has been received by the plurality of VR terminals, and the predetermined presentation is being presented to the users on the respective VR terminals;
said second processes comprising:
    receiving one or more commands to output corresponding one or more elements of said interactive information, said one or more commands having been generated by the presenter using the computer, and transmitting over the first antenna a first set of instructions to each VR terminal to output said one or more elements of said interactive information, and
    receiving over the first antenna interactive feedback generated by one or more of the users using the respective VR terminals, and transmitting a second set of instructions over the first antenna to the computer to output the interactive feedback;
wherein the communication software comprises a socket server configured to define and manage one or more sockets dedicated to said receiving and transmitting;
wherein the socket server is configured to define and manage:
    a first communication channel dedicated to communication between the computer and the presentation unit via the first antenna, and
    a second communication channel dedicated to communication between the presentation unit and said plurality of VR terminals via the first antenna;
wherein said first and second communication channels each comprise said one or more sockets and define a third communication channel for communication between the computer and said plurality of VR terminals.

2. The presentation unit according to claim 1, wherein said first antenna provides a single access point to said local area network.

3. The presentation unit according to claim 1, wherein the presentation unit is configured as a cloud server, and wherein said network is Internet based.

4. The presentation unit according to claim 1, wherein said first processes comprise:
directly or indirectly, causing the predetermined presentation to be transmitted to the plurality of VR terminals from the Internet; or
directly causing the predetermined presentation to be transmitted to the plurality of VR terminals from the presentation unit, wherein the presentation software comprises delivery software configured to transmit the predetermined presentation to said plurality of VR terminals upon receiving a corresponding trigger from the communication software.

5. The presentation unit according to claim 4, wherein the presentation software comprises a database manager configured to assist the delivery software in retrieving the predetermined presentation from said memory.

6. The presentation unit according to claim 4, wherein the delivery software is configured to utilize a conventional communication protocol for transmitting the predetermined presentation to said plurality of VR terminals.

7. The presentation unit according to claim 6, wherein said conventional communication protocol is HTTP.

8. The presentation unit according to claim 1, wherein the communication software is configured to utilize a custom communication protocol for said receiving and transmitting.

9. The presentation unit according to claim 1, wherein the presentation software comprises a presentation manager accessible from said computer over said local area network and arranged to provide the computer with an interface for creating, editing and/or playing the predetermined presentation.

10. The presentation unit according to claim 9, wherein said presentation manager is accessible from a Web browser installed on said computer and said interface is a Web interface.

11. The presentation unit according to claim 1, wherein the VR media are selected from 2D or 360 degree photos or videos, or 3D objects.

12. The presentation unit according to claim 1, wherein the predetermined presentation comprises one or more markers for instigating output on said plurality of VR terminals of selected elements of said one or more elements of the interactive information; and
   wherein said one or more elements of the interactive information comprise one or more of: a text, a shape, a position indicator and an interactive feature including a poll, a quiz or a game; or
   wherein the interactive feedback relates to one or more user feedback tools selected from one or more of: a field of view, a direction of view, a feedback signal generated by interaction of the user with a feedback feature of the respective VR terminal, including a response to a poll or a quiz, and information related to a status of the respective VR terminal including a charge status of the VR terminal if the VR terminal is battery operated.

13. The presentation unit according to claim 1, wherein said predetermined presentation comprises one or more presentation slides and wherein said second processes further comprise:
   receiving one or more navigation inputs generated by the presenter using the computer; and
   transmitting a third set of instructions to at least a subgroup of the plurality of VR terminals so that said subgroup simultaneously outputs a selected presentation slide.

14. A presentation system comprising:
   a computer;
   a plurality of VR terminals; and
   a presentation unit for presenting to said plurality of VR terminals for use by respective users, said presentation unit comprising:
      a case;
      a printed circuit board (PCB) accommodated within said case, the PCB supporting a processor and a memory operatively connected to said processor;
      a networking apparatus comprising:
         a first antenna configured for communicating with the computer and the plurality of VR terminals across a local area network; and
         a second antenna for connecting the presentation unit to the Internet; and
      wherein the memory is configured to store presentation software configured to cause said processor to perform first processes for confirming a presence of a predetermined presentation on the plurality of the VR terminals, wherein the predetermined presentation comprises VR content comprising one or more VR media and interactive information comprising one or more interactive elements allowing a presenter to interact with the users during the predetermined presentation,
      said presentation software further comprising communication software configured to cause the processor to perform second processes, distinct from said first processes, if:
         the first processes confirm via communications over the first antenna that the predetermined presentation has been received by the plurality of VR terminals, and
         the predetermined presentation is being presented to the users on the respective VR terminals;
      said second processes comprising:
         receiving one or more commands to output corresponding one or more elements of said interactive information, said one or more commands having been generated by the presenter using the computer, and transmitting over the first antenna a first set of instructions to each VR terminal to output said one or more elements of said interactive information, and
         receiving over the first antenna interactive feedback generated by one or more of the users using the respective VR terminals, and transmitting a second set of instructions over the first antenna to the computer to output the interactive feedback;
      wherein the communication software comprises a socket server configured to define and manage one or more sockets dedicated to said receiving and transmitting;
      wherein the socket server is configured to define and manage:
         a first communication channel dedicated to communication between the computer and the presentation unit via the first antenna, and
         a second communication channel dedicated to communication between the presentation unit and said plurality of VR terminals via the first antenna;
      wherein said first and second communication channels each comprise said one or more sockets and define a third communication channel for communication between the computer and said plurality of VR terminals; and
      wherein said computer, said plurality of VR terminals and said presentation unit are arranged to communicate over said local area network.

15. The presentation system according to claim 14, wherein said plurality of VR terminals comprise one or more headsets, with said one or more headsets comprising one or more smart phones.

16. The presentation system according to claim 14, further comprising one or more non-VR/AR terminals for presenting said predetermined presentation.

17. The presentation system according to claim 16, wherein the one or more non-VR/AR terminals include at least one of a desktop computer, a portable computer, a tablet and a screen.

18. A method of presenting a presentation using a presentation system comprising a computer; a plurality of VR terminals; and a presentation unit for presenting to said plurality of VR terminals for use by respective users, said presentation unit comprising:
   a case;
   a printed circuit board (PCB) accommodated within said case, the PCB supporting a processor and a memory operatively connected to said processor;
   a networking apparatus comprising:
      a first antenna configured for communicating with the computer and the plurality of VR terminals across a local area network; and
      a second antenna for connecting the presentation unit to the Internet; and
   wherein the memory is configured to store presentation software configured to cause said processor to perform first processes for confirming a presence of a predetermined presentation on the plurality of the VR terminals, wherein the predetermined presentation comprises VR content comprising one or more VR media and interactive information comprising one or more interactive elements allowing a presenter to interact with the users during the predetermined presentation, said presentation software further comprising communication software configured to cause the processor to perform second processes, distinct from said first processes, if:
   the first processes confirm via communications over the first antenna that the predetermined presentation has been received by the plurality of VR terminals, and
   the predetermined presentation is being presented to the users on the respective VR terminals;
wherein the communication software comprises a socket server configured to define and manage one or more sockets;
wherein the socket server is configured to define and manage:
   a first communication channel dedicated to communication between the computer and the presentation unit via the first antenna, and
   a second communication channel dedicated to communication between the presentation unit and said plurality of VR terminals via the first antenna;
wherein said first and second communication channels each comprise said one or more sockets and define a third communication channel for communication between the computer and said plurality of VR terminals; and
wherein said computer, said plurality of VR terminals and said presentation unit are arranged to communicate over said local area network;
the method comprising for the second processes, using the communication software:
   receiving, via the first antenna, one or more commands to output corresponding one or more elements of said interactive information, said one or more commands having been generated by the presenter using the computer;
   receiving, via the first antenna, interactive feedback generated by one or more of the users using the respective VR terminals;
   transmitting, via the first antenna, a first set of instructions to each VR terminal to output said one or more elements of said interactive information; and
   transmitting, via the first antenna, a second set of instructions to the computer to output the interactive feedback.

* * * * *